United States Patent
Yamamoto et al.

(10) Patent No.: US 8,395,982 B2
(45) Date of Patent: Mar. 12, 2013

(54) OBJECTIVE LENS FOR OPTICAL PICKUP DEVICE, OPTICAL PICKUP DEVICE, AND OPTICAL INFORMATION RECORDING AND REPRODUCING DEVICE

(75) Inventors: Shogo Yamamoto, Tokyo (JP); Kenichi Ishii, Uenohara (JP); Takeshi Kojima, Hachioji (JP); Kentarou Nakamura, Tokyo (JP); Jinichi Kasuya, Kokubunji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/498,312

(22) PCT Filed: Sep. 14, 2010

(86) PCT No.: PCT/JP2010/065800
§ 371 (c)(1),
(2), (4) Date: Mar. 26, 2012

(87) PCT Pub. No.: WO2011/040227
PCT Pub. Date: Apr. 7, 2011

(65) Prior Publication Data
US 2012/0182854 A1 Jul. 19, 2012

(30) Foreign Application Priority Data
Sep. 29, 2009 (JP) ................................. 2009-225049

(51) Int. Cl.
*G11B 7/135* (2012.01)
(52) U.S. Cl. .......... 369/112.26; 369/112.08; 369/112.13
(58) Field of Classification Search ............. 369/112.08, 369/112.13, 112.2, 112.23, 112.26
See application file for complete search history.

(56) References Cited

U.S. PATENT DOCUMENTS

| 6,624,941 | B2 * | 9/2003 | Takeuchi et al. | 359/566 |
| 7,656,770 | B2 * | 2/2010 | Nakamura et al. | 369/112.12 |
| 7,843,793 | B2 * | 11/2010 | Nakamura et al. | 369/112.26 |

FOREIGN PATENT DOCUMENTS

| JP | 2008-293630 | 12/2008 |
| JP | 2009-199708 | 9/2009 |
| JP | 2009-211795 | 9/2009 |
| JP | 2009-277311 | 11/2009 |
| JP | 2010-55683 | 3/2010 |

* cited by examiner

*Primary Examiner* — Hoa T Nguyen
*Assistant Examiner* — Andrew Sasinowski
(74) *Attorney, Agent, or Firm* — Cozen O'Connor

(57) ABSTRACT

Provided is an optical pickup device capable of ensuring the compatibility among three types of optical discs, i.e., BDs, DVDs, and CDs, with a common objective lens and, in addition, capable of ensuring a sufficient working distance for CDs, and also provided are an optical information recording and reproducing device and an objective lens suitable for the optical information recording and reproducing device. On the objective lens, there is arranged a first optical path difference providing structure formed such that: the direction of step differences of a basic structure wherein the diffraction order of a blue-violet laser light flux become an odd order faces toward the opposite direction of the optical axis; the direction of step differences of a basic structure wherein the diffraction order of the blue-violet laser light flux become an even order faces toward the optical axis; and both the basic structures are overlapped together.

8 Claims, 18 Drawing Sheets

OPTICAL AXIS DIRECTION

+

=

Wa (mm)

OBJECTIVE LENS FOR OPTICAL PICKUP DEVICE, OPTICAL PICKUP DEVICE, AND OPTICAL INFORMATION RECORDING AND REPRODUCING DEVICE

This is a U.S. National Phase Application under 35 USC 371 of International Application PCT/JP2010/065800 filed on Sep. 14, 2010.

This application claims the priority of JP 2009-225049 filed Sep. 29, 2009, the entire content of which is hereby incorporated by reference.

TECHNICAL FIELD

The present invention relates to an optical pickup device which can record and/or reproduce (record/reproduce) information compatibly for various types of optical discs, and to an objective lens and an optical information recording and reproducing device.

BACKGROUND ART

In recent years, in an optical pickup device, a wavelength of a laser light source which is employed as a light source for reproducing information recorded on an optical disc and for recording information on an optical disc, is becoming shorter. For example, laser light sources having wavelength of 390-420 nm, such as a blue-violet semiconductor laser, are reaching the stage of practical application. A use of such the blue-violet laser light sources enables to record information of 15-20 GB on an optical disc with a diameter of 12 cm, when an objective lens with a numerical aperture (NA) which is the same as that for a DVD (Digital Versatile Disc) is used. When the NA of the objective optical element is increased up to 0.85, information of 23-25 GB can be recorded onto an optical disc with a diameter of 12 cm.

As an example of an optical disc using the above objective lens with NA of 0.85, there is cited a BD (BLU-RAY DISC). In a BD, since coma which is generated because of an inclination (skew) of an optical disc increases, a protective substrate is designed to be thinner than that of a DVD (to be 0.1 mm, while it is 0.6 mm for a DVD), to reduce the amount of coma coming from a skew.

Besides, it is hard to say that a value of an optical disc player/recorder (optical information recording and reproducing device) as a product is not enough under just a condition that it can record/reproduce information for BDs properly. Taking account of a fact that DVDs and CDs (Compact Discs) onto which various kinds of information have been recorded, are on the market at present, it is not enough that the device can record/reproduce information only for BDs properly. For example, realization of recording and/or reproducing information appropriately also for DVDs and CDs which are owned by users, leads to enhancement of its commercial value as an optical disc player/recorder for BDs. From such the background, an optical pickup device installed in an optical disc player/recorder for BDs is required to have a function capable of appropriately recording and/or reproducing information not only for BDs but also for DVDs and CDs.

As a method capable to record and/or reproduce information adequately to anyone of BDs and DVDs and further to CDs, with maintaining compatibility, there can be considered a method to selectively switch an optical system for BDs and an optical system for DVDs and CDs, corresponding to a distinguishing feature of a BD, DVD or CD on which information is recorded and/or reproduced. However, it is disadvantageous for the size-reduction and increases the cost, because it requires plural optical systems.

Accordingly, in order to simplify the structure of an optical pickup device and to intend the reduction of cost, it is preferable to make an optical system for BDs and an optical system for DVDs and CDs into a common optical system, and to reduce the number of optical parts constructing the optical pickup device as much as possible, in the optical pickup device with the compatibility. Then, providing the common objective lens which is arranged with facing an optical disc, is most advantageous for the simplification of the construction and cost reduction of the optical pickup device. In order to obtain an objective lens which can be commonly used for plural kinds of optical discs for which different recording/reproducing wavelengths are used, it is required that an optical path difference providing structure having a wavelength dependency in a spherical aberration, is formed on the objective lens.

Patent Literature 1 discloses an objective lens which includes a structure wherein two basic structures each being a diffractive structure are overlapped together and can be used commonly for three types of optical discs, and discloses an optical pickup device equipped with the objective lens.

As one of great problems of an objective lens which can be commonly used for three types of optical discs, especially an objective lens which can be commonly used for three types of optical discs of a BD, a DVD and a CD, there is a problem combing e securing the axial thickness which is suitable for handling a BD with securing a working distance which is suitable for handling a CD having a thick protective substrate. Further, it is required to realize a stable mass-production and an easy installation of the lens to an optical pickup device while achieving the solution of the above problem.

However, Patent Literature 1 does not disclose concrete examples of a ratio of a diameter of an effective aperture on an optical surface and concrete examples of a flange shape. Patent Literature 1 does not disclose which kind of shape is preferable as the overall structure of an objective lens, other than optical surfaces, from the viewpoint of the stable mass-production and easy installation to an optical pickup device, under the condition that both of securing the axial thickness suitable for handling a BD and securing a working distance suitable for handling a CD having a thick protective substrate have been achieved.

CITATION LIST

Patent Literature

Patent Literature 1: JP-A No. 2008-293630

SUMMARY OF INVENTION

Technical Problem

The prevent invention has been achieved to solve the above problem, and is aimed to provide an objective lens, an optical pickup device and an optical image recording and reproducing device equipped with the objective lens. Thereby, the compatible use of the three types of optical discs of a BD, a DVD and a CD is achieved by a common objective lens, and the objective lens enables to sufficiently secure the stable mass-productivity and easy installation to an optical pickup device even under the condition that both of securing the axial thickness suitable for handling a BD and securing a working distance of the lens suitable for handling a CD with a thick protective substrate area have been achieved.

Solution to Problem

An objective lens described in item 1 is an objective lens for an optical pickup device including a first light source for emitting a first light flux with a first wavelength λ1, a second light source for emitting a second light flux with a second wavelength λ2 (λ2 >λ1) and a third light source for emitting a third light flux with a third wavelength λ3 (λ3 >λ2). The optical pickup device records and/or reproduces information of a first optical disc including a protective substrate with a thickness t1 by using the first light flux, records and/or reproduces information of a second optical disc including a protective substrate with a thickness t2 by using the second light flux, and records and/or reproduces information of a third optical disc including a protective substrate with a thickness t3 by using the third light flux. The objective lens is characterized by comprising a first optical surface and a second optical surface which are opposite to each other, wherein at least the first optical surface comprises at least three areas of a central area, an intermediate area surrounding the central area, and a peripheral area surrounding the intermediate area. The central area comprises a first optical path difference providing structure and the intermediate area comprises a second optical path difference providing structure. The objective lens converges the first light flux passing through the central area of the objective lens onto an information recording surface of the first optical disc so that information can be recorded and/or reproduced thereon, converges the second light flux passing through the central area of the objective lens onto an information recording surface of the second optical disc so that information can be recorded and/or reproduced thereon, and converges the third light flux passing through the central area of the objective lens onto an information recording surface of the third optical disc so that information can be recorded and/or reproduced thereon. The objective lens converges the first light flux passing through the intermediate area of the objective lens onto an information recording surface of the first optical disc so that information can be recorded and/or reproduced thereon, and converges the second light flux passing through the intermediate area of the objective lens onto an information recording surface of the second optical disc so that information can be recorded and/or reproduced thereon. The objective lens converges the first light flux passing through the peripheral area of the objective lens onto an information recording surface of the first optical disc so that information can be recorded and/or reproduced thereon. A ratio of a diameter of the peripheral area to an overall diameter of the first optical surface is 90% or more and is 100% or less. A ratio of a diameter of an effective aperture on the second optical surface corresponding to the peripheral area to an overall diameter of the second optical surface is 75% or more and is 100% or less. The objective lens satisfies the following conditional expressions.

$$2 \leq d\text{max}/d\text{min} \leq 8 \quad (1)$$

$$0.9 \leq d\text{max}/f \leq 1.5 \quad (2)$$

In the expressions, dmax (mm) represents an axial thickness of the objective lens, dmin (mm) represents a thickness of the objective lens at a position where the objective lens is thinnest in a direction of an optical axis thereof, and f (mm) represents a focal length of the objective lens for the first light flux.

The present inventors have found the followings. When the objective lens is configured to handle an optical disc with a high NA using a short wavelength such as a BD, there is caused a problem that astigmatism is easily generated and decentration coma is easily generated. However, when the conditional expression (2) is satisfied, generation of astigmatism and decentration coma can be controlled. When the objective lens which can handle three types of optical discs satisfies the conditional expression (2), both of securing the axial thickness suitable for handling such the BD and securing a working distance suitable for handling a CD which has a thick protective substrate can be achieved. Further, when the objective lens satisfies the conditional expression (1), the flange of the objective lens is prevented from being excessively thin while the conditional expression (2) is satisfied, which results in a stable production of the objective lenses and providing objective lenses which are hardly broken. Further, when the ratio of the diameter of the effective aperture on each optical surface is set to be within the range of item 1, the following matters are allowed. Stable optical surfaces with less production errors within the effective apertures can be obtained, while the flange of the objective lens is prevented from being thin. Further, there is provided an increased permissible amount of installation error to an optical pickup device, where the installation error is generated in the direction perpendicular to the optical axis when the objective lens is installed in an optical pickup device, which resulting in an increase of installation easiness of the objective lens to the optical pickup device.

The objective lens described in Item 2 is an invention described in Item 1, characterized in that the first optical path difference providing structure is a structure in which a plurality of basic structures are overlapped together.

The objective lens described in Item 3 is an invention described in Item 2, characterized in that the plurality of basic structures are a first basic structure being a blaze-type structure and a second basic structure being a blaze-type structure.

The objective lens described in Item 4 is an invention described in Item 2, characterized in that the plurality of basic structures are a first basic structure being a blaze-type structure and a second basic structure being a step-type structure.

The objective lens described in Item 5 is an invention described in Item 1, characterized in that the first optical path difference providing structure consists of a single basic structure.

The objective lens described in Item 6 is an invention described in Item 5, characterized in that the basic structure is a step-type structure.

The optical pickup device described in Item 7 is an optical pickup device characterized by comprising the objective lens of any one of Items 1 to 6.

The optical information recording and reproducing device described in Item 7 is an optical information recording and reproducing device characterized by comprising the optical pickup device of Item 7.

An optical pickup device relating to the present invention includes at least three light sources of a first light source, a second light source and a third light source. Further, the optical pickup device relating to the present invention includes a light converging optical system for converging the first light flux onto an information recording surface of the first optical disc, converging the second light flux onto an information recording surface of the second optical disc and converging the third light flux onto an information recording surface of the third optical disc. The optical pickup device relating to the present invention further includes a light-receiving element for receiving a reflection light flux coming from an information recording surface of the first optical disc, the second optical disc or the third optical disc.

The first optical disc includes a protective substrate with a thickness of t1 and an information recording surface. The second optical disc includes a protective substrate with a thickness of t2 (t1<t2) and an information recording surface. The third optical disc includes a protective substrate with a thickness of t3 (t2<t3) and an information recording surface. It is preferable that the first optical disc is a BD, the second optical disc is a DVD and the third optical disc is a CD. However, the first to third optical discs do not limited to those. The first optical disc, the second optical disc and the third optical disc may be multilayered optical discs each includes plural information recording surfaces.

In the present specification, a BD represents a generic name of optical discs in a group of BDs wherein information is recorded/reproduced by using a light flux with a wavelength in the range of about 390 nm to 415 nm and an objective lens with NA in the range of about 0.8 to about 0.9 and the thickness of the protective substrate is about 0.05 mm to 0.125 mm. The BDs involve a BD including only a single information recording surface and a BD including two information recording surfaces. Further in the present specification, a DVD represents a generic name of optical discs in a group of DVDs wherein information is recorded/reproduced by using an objective lens with NA in the range of about 0.60 to about 0.67 and the thickness of the protective substrate is about 0.6 mm. The DVDs involve DVD-ROM, DVD-Video, DVD-Audio, DVD-RAM, DVD-R, DVD-RW, DVD+R and DVD+RW. In the present specification, a CD represents a generic name of optical discs in a groups of CDs wherein information is recorded and/or reproduced by an objective lens with NA in the range of about 0.45 to 0.51 and the protective layer has the thickness about 1.2 mm. The CDs involve CD-ROM, CD-Audio, CD-Video, CD-R and CD-RW. As for a recording density, a BD has the highest recording density, and a DVD and CD have lower recording densities in this order.

Thicknesses t1, t2, and t3 of the protective substrates preferably satisfy the following conditional expressions (3), (4), and (5). However, the thicknesses are not limited to them. A thickness of a protective substrate in the specification means that a thickness of a protective substrate arranged on an optical disc surface where light enters. On the other words, it represents a thickness of a protective substrate from the surface of the optical disc to the information recording surface closest to the surface.

$$0.050 \text{ mm} \leq t1 \leq 0.125 \text{ mm} \quad (3)$$

$$0.5 \text{ mm} \leq t2 \leq 0.7 \text{ mm} \quad (4)$$

$$1.0 \text{ mm} \leq t3 \leq 1.3 \text{ mm} \quad (5)$$

In the present specification, each of the first light source, the second light source, and the third light source is preferably a laser light source. Lasers such as a semiconductor laser and a silicon laser are preferably used for the laser light source. The first wavelength $\lambda 1$ of the first light flux emitted from the first light source is shorter than the second wavelength $\lambda 2$ of the second light flux emitted from the second light source. The second wavelength $\lambda 2$ is shorter than the third wavelength $\lambda 3$ of the third light flux emitted from the third light source.

When a BD, DVD, and CD are employed as the first optical disc, the second optical disc, and the third optical disc, respectively, the wavelength $\lambda 1$ of the first light source is preferably 350 nm or more, and 440 nm or less, and is more preferably 390 nm or more, and 415 nm or less; the second wavelength $\lambda 2$ of the second light source is preferably 570 nm or more, and 680 nm or less, and is more preferably 630 nm or more, and 670 nm or less; and the third wavelength $\lambda 3$ of the third light source is preferably 750 nm or more, and 880 nm or less, and is more preferably 760 nm or more, and 820 nm or less.

Further, at least two light sources of the first light source, the second light source, and the third light source may be unitized. The unitization means fixing and housing, for example, the first light source and the second light source into one package. Further, in addition to the light sources, the light-receiving elements which will be described later may also be provided as one package.

As the light-receiving element, a photo detector such as a photo diode is preferably used. Light reflected on an information recording surface of an optical disc enters into the light-receiving element, and signal outputted from the light-receiving element is used for obtaining signal obtained by reading the information recorded in each optical disc. Further, a change in the light amount caused with a change in shape and a change in position of the spot on the light-receiving element, are detected to conduct the focus detection and the tracking detection. Based on these detections, the objective lens can be moved for focusing and tracking operations. The light-receiving element may be composed of a plurality of photo detectors. The light-receiving element may also have a main photo detector and secondary photo detector. For example, the light-receiving element is provided with a main photo detector which receives the main light used for recording and reproducing information, and two secondary photo detectors positioned on both sides of the main photo detector so as to receive secondary light for tracking adjustment by the two secondary photo detectors. Further, the light-receiving element may also comprise a plurality of light-receiving elements corresponding to respective light sources.

The light-converging optical system comprises an objective lens. The light-converging optical system preferably comprises a coupling lens such as a collimation lens additionally to the objective lens. The coupling lens is a single lens or a lens group which is arranged between the objective lens and the light source and changes divergent angle of a light flux. The collimation lens is a kind of coupling lens and is a lens to convert a light flux which has entered the collimation lens into a parallel light flux. In the present specification, an objective lens means an optical system which is arranged to face an optical disc in an optical pickup device and has a function to converge a light flux emitted from a light source onto an information recording surface of an optical disc. The objective lens is preferably an objective lens formed of one lens. The objective lens may be a glass lens, a plastic lens or a hybrid lens in which an optical path difference providing structure formed of a material such as photo-curable resin, UV-curable resin and thermosetting resin is formed on the glass lens. The objective lens may comprise a refractive surface which is an aspheric surface. Further, the objective lens preferably has an aspheric base surface on which an optical path difference providing structure is provided.

Further, when the objective optical element is a glass lens, it is preferable that a glass material with glass transition point Tg of 500° C. or less, more preferably of 400° C. or less, is used. By using the glass material whose glass transition point Tg is 500° C. or less, the material can be molded at a comparatively low temperature. Therefore, the life of the mold can be prolonged. As an example of the glass material whose glass transition point Tg is low, there are cited K-PG325 and K-PG375 (both are trade names) made by SUMITA Optical glass, Inc.

Hereupon, a glass lens has generally larger specific gravity than a resin lens. Therefore, the objective lens made of glass has larger weight and applies a larger burden to an actuator which drives the objective lens. Therefore, when a glass lens is employed for the objective lens, a glass material having small specific gravity is preferably used for the objective lens. Specifically, the specific gravity is preferably 4.0 or less, and is more preferably 3.0 or less.

Additionally, linear expansion coefficient α is one of physical properties which are important when a glass lens is molded and produced. If a material with Tg of 400° C. or less is selected, the temperature difference of Tg and the room temperature is still greater in comparison with plastic materials. When a lens is molded by using a material with large linear expansion coefficient α, the lens easily cracks when a temperature falls down. Linear expansion coefficient α of a lens material is preferably 200 (10E-7/K) or less, and is more preferably 120 or less.

Further, when a plastic lens is employed for the objective lens, it is preferable that alicyclic hydrocarbon polymers such as a resin material in a cyclic olefin group are used for the objective lens. As the resin materials, there is more preferably used a resin material having: a refractive index at the temperature 25° C. for wavelength 405 nm, which is within the range of 1.54 to 1.60; and a ratio of refractive index change dN/dT (° C.$^{-1}$) caused by a temperature change within the temperature range of −5° C. to 70° C. for the wavelength 405 nm, which is within the range of $-20 \times 10^{-5}$ to $-5 \times 10^{-5}$ (more preferably, $-10 \times 10^{-5}$ to $-8 \times 10^{-5}$). Further, when a plastic lens is employed for the objective lens, it is preferable that a plastic lens is also employed for the coupling lens.

Preferable examples of alicyclic hydrocarbon polymers will be described below.

First preferable example is a resin composition comprising block copolymer including polymer block [A] containing a repeating unit [1] represented by the following Formula (1), and polymer block [B] containing the repeating unit [1] represented by the Formula (1) and a repeating unit [2] represented by the following Formula (2), and/or a repeating unit [3] represented by the Formula (3). The block copolymer satisfies a relationship of a>b, where a is a mol fraction (mol %) of the repeating unit [1] in the polymer block [A] and b is a mol fraction (mol %) of the repeating unit [1] in the polymer block [B].

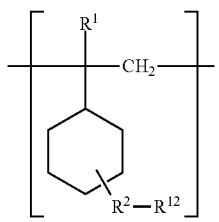
(1)

(In the above formula, $R^1$ represents a hydrogen atom or an alkyl group having a carbon number of 1-20, $R^2$-$R^{12}$ each independently represent a hydrogen atom, an alkyl group having a carbon number of 1-20, hydroxyl group, an alkoxy group having a carbon number of 1-20 or a halogen group.)

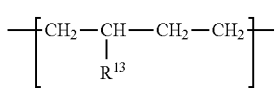
(2)

(In the above formula, $R^{13}$ represents a hydrogen atom or an alkyl group having a carbon number of 1-20.)

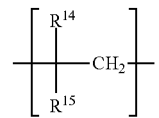
(3)

(In the above formula, $R^{14}$ and $R^{15}$ each independently represents a hydrogen atom or an alkyl group having a carbon number of 1-20.)

Second preferable example is a resin composition containing polymer (A) obtained by an addition polymerization at least of α-olefin with 2-20 carbon atoms and monomer composition consisting of cyclic olefin represented by the following general formula (4), and containing polymer (B) obtained by an addition polymerization of α-olefin with 2-20 carbon atoms and monomer composition containing cyclic olefin represented by following general formula (5).

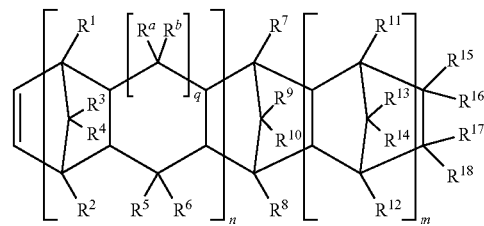
General formula (4)

(In the above formula, n is 0 or 1, m is 0 or a positive integer, and q is 0 or 1. $R^1$ to $R^{18}$ and $R^a$ and $R^b$ each independently represent a hydrogen atom, a halogen atom or a hydrocarbon group. As for $R^{15}$-$R^{18}$, each may be bonded to another to form a monocyclic or polycyclic group, and the monocyclic or polycyclic group formed in this manner may have double bonds. Also an alkylidene group may also be formed with $R^{15}$ and $R^{16}$ or $R^{17}$ and $R^{18}$.)

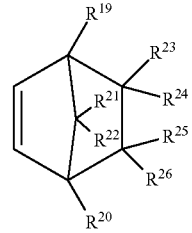
General formula (5)

(In the above formula, $R^{19}$-$R^{26}$ each independently represents a hydrogen atom, a halogen atom or a hydrocarbon group.)

The following additives may be added to the resin material in order to add an extra property to the resin material.

(Additives)

It is preferable to add at least one type of additive selected from the group of phenol type stabilizer, hindered amine type stabilizer, phosphor type stabilizer, and sulk type stabilizer. By properly selecting and adding these stabilizers, cloudiness caused when the material is continuously irradiated with a light flux with a short wavelength such as 405 nm, and fluctuation of optical property such as fluctuation of refractive index, can be controlled more properly.

For preferable phenol type stabilizer, usually known ones can be employed. For example, the followings are cited: acrylate compounds described in JP-A Nos. 63-179953 and 1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; an alkyl-substituted phenol compound such as octadecyl-3-(3, 5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris (3,5-di-t-butyl-4-hydroxybenzyl)benzene, tetrakis(methylene-3-(3',5'-di-t-butyl-4'-hydroxyphenylpropionate)methane, namely pentaerythrimethyl-tetrakis(3-(3,5-di-t-butyl-4-hydroxyphenylpropionate) and triethylene glycol bis-(3-(3-t-butyl-4-hydroxy-5-methylphenyl)-propionate; and a triazine group-containing phenol compound such as 6-(4-hydroxy-3,5-di-t-butylanilino)-2,4-bisoctyl-1,3,5-triazine, 4-bisoctylthio-1,3,5-triazine and 2-octylthio-4,6-bis-(3,5-di-t-butyl-4-oxyanilino)-1,3,5-triazine.

For preferable hindered amine type stabilizer, the following samples are cited: bis(2,2,6,6-tetramethyl-4-piperidyl)sebacate, bis(2,2,6,6-tetramethyl-4-piperidyl)succinate, bis(1, 2,2,6,6-pentamethyl-4-piperidyl)sebacate, bis(N-octoxy-2, 2,6,6-tetramethyl-4-piperidyl)sebacate, bis(N-benzyloxy-2, 2,6,6-tetramethyl-4-piperidyl)sebacate, bis(N-cyclohexyloxy-2,2,6,6-tetramethyl-4-piperidyl)sebacate, bis (1,2,2,6,6-pentamethyl-4-piperidyl)-2-(3,5-di-t-butyl-4-hydroxybenzyl)-2-butylmalonate, bis(1-acroyl-2,2,6,6-tetramethyl-4-piperidyl)2,2-bis(3,5-di-t-butyl-4-hydroxybenzyl)-2-butylmalonate, bis(1,2,2,6,6-pentamethyl-4-piperidyl decanedioate, 2,2,6,6-tetramethyl-4-piperidyl methacrylate, 4[3-(3,5-di-t-butyl-4-hydroxyphenyl)propionyloxy]-1-[2-(3-(3,5-di-t-buty-1-4-hydroxyphenyl)propionyloxy)ethyl]-2,2,6,6-tetramethyl piperidine, 2-methyl-2-(2, 2,6,6-tetramethyl-4-piperidyl)amino-N-(2,2,6,6-tetramethyl-4-piperidyl)propionamide, tetrakis(2,2,6,6-tetramethyl-4-piperidyl)1,2,3,4-butanetetracarboxylate, tetrakis(1,2,2,6,6-pentamethyl-4-piperidyl)1,2,3,4-butane-tetracarboxylate.

As for preferable phosphor type stabilizer, ones usually employed in the field of resin industry can be employed without any limitation. For example, the followings are cited: monophosphite compounds such as triphenyl phosphate, diphenylisodecyl phosphate, phenylisodecyl phosphate, tris (nonylphenyl)phosphate, tris(dinonylphenyl)phosphate, tris (dinonylphenyl)phosphate, tris(2,4-di-t-butylphenyl)phosphate, and 10-(3,5-di-t-butyl-4-hydroxybenzyl)-9,10-dihydro-9-oxa-10-Phosphaphenanthrene-10-oxide; and diphosphite compounds such as 4,4'-butylidene-bis(3-methyl-6-t-butylphenyl-di-tridecyl phosphate and 4,4'-isopropyridene-bis(phenyl-di-alkyl($C_{12}$ to $C_{15}$)phosphate). Among them, the monophosphite compounds are preferable and tris (nonylphenyl)phosphate, tris(dinonylphenyl)phosphate and tris(2,4,-di-t-butylphenyl)phosphate are particularly preferable.

As for preferable sulk type stabilizer, the following examples are cited: dilauryl 3,3-thiodipropionate, dimyrystyl 3,3'-thiodipropionate, distearyl 3,3-thiodipropionate, laurystearyl 3,3-dithiopropionate, pentaerythrytol-tetrakis-(β-laurylstearyl-thio-propionate and 3,9-bis-(2-dodecylthioethyl)-2,4,8,10-tetraldspiro[5,5]undecane.

The adding amount of each stabilizer is optionally decided within the range in which the object of the invention is not vitiated; it is usually from 0.01 to 2 parts by weight and preferably from 0.01 to 1 part by weight to 100 parts by weight of the alicyclic hydrocarbon polymer.

(Surfactant)

Surfactant is a compound having a hydrophilic group and a hydrophobic group in the identical molecule. The surfactant inhibits cloudiness of resin composition by adjusting the speed of moisture adhesion to the resin surface and of moisture vaporization from the foregoing surface.

Specific examples of the hydrophilic group in the surfactant include a hydroxy group, a hydroxyalkyl group having at least one carbon atom, a hydroxyl group, a carbonyl group, an ester group, an amino group, an amide group, an ammonium salt, thiol, sulfate, phosphate, and a polyalkyleneglycol group. Herein, the amino group may be any of a primary amino group, a secondary amino group and a tertiary amino group. Specific examples of the hydrophobic group in the surfactant include an alkyl group having six carbon atoms, a silyl group including an alkyl group having six carbon atoms, and a fluoroalkyl group having six carbon atoms. Herein, the alkyl group having six carbon atoms may possess an aromatic ring as a substituent. Specific examples of the alkyl group include hexyl, heptyl, octyl, nonyl, decyl, undecenyl, dodecyl, tridecyl, tetradecyl, myristyl, stearyl, lauryl, palmityl, and cyclohexyl. As the aromatic ring, a phenyl group can be provided. This surfactant may possess at least one hydrophilic group and one hydrophobic group each in the identical molecule, or may possess two hydrophilic groups and two hydrophobic groups.

Further specific examples of such the surfactant include myristyl diethanolamine, 2-hydroxyethyl-2-hydroxyldodexylamine, 2-hydroxyethyl-2-hydroxytridecylamine, 2-hydroxyethyl-2-hydroxytetradecylamine, pentaerythritol-monostearate, pentaerythritoldistearate, pentaerythritoltristearate, di-2-hydroxyethyl-2-hydroxy-dodecylamine, alkyl (8-18 carbon atoms) benzyldimethylammonium chloride, ethylene bis alkyl (8-18 carbon atoms) amide, stearyl diethanolamide, lauryl diethanolamide, myristyl diethanolamide, and palmityl diethanolamide. Of these, amine compounds and amide compounds having a hydroxyalkyl group are preferably used. In the present embodiment, these compounds may be used in combination of at least two kinds.

The adding amount of surfactant is preferably from 0.01 to 10 parts by weight to 100 parts by weight of the alicyclic hydrocarbon polymer from the viewpoint of efficient restriction of cloudiness of a product caused by fluctuation of temperature and humidity and the viewpoint of maintain the high light transmittance of the product. The addition amount of the surfactant is more preferably 0.05-5 parts by weight, with respect to 100 parts by weight of the alicyclic hydrocarbon based polymer, and further more preferably 0.3-3 parts by weight.

(Plasticizer)

Plasticizer is added as in need to adjust the melt index of the copolymer.

As for plasticizer, usually known ones can be employed. For example, the followings are cited: bis(2-ethylhexyl)adipate, bis(2-budoxyethyl)adipate, bis(2-ethylhexyl)azelate, dipropyleneglycol dibenzoate, tri-n-butyl citrate, tri-n-butylacetyl citrate, epoxidized soybean oil, 2-ethylhexyl epoxidized tall oil, chlorinated paraffin, tri-2-ethylhexyl phosphate, tricresyl phosphate, t-butylphenyl phosphate, tri-2-ethylhexyldiphenyl phosphate, dibutyl phthalate, diisohexyl phthalate, diheptyl phthalate, dinonyl phthalate, diundecyl phthalate, di-2-ethylhexyl phthalate, diisononyl phthalate, diisodecyl phthalate, ditridecyl phthalate, butylbenzyl phthalate, disyclohexyl phthalate, bis(2-ethylhexyl)sebacate, (tri- 2-ethylhexyl)trimellitic acid, Santicizer 278, Paraplex G40, Drapex 334F, Plastolein 9720, Mesamoll, DNODP-610, and HB-40. Selection of placticizer and its amount of addition can be determined arbitrarily so long as transmittance and durability against change in the environment of the copolymer are not degraded.

As the resin, cycloolefin resin is employed suitably. Specifically, ZEONEX by ZEON CORPORATION, APEL by Mitsui Chemicals, Inc., TOPAS made from TOPAS Advanced Polymers, ARTON by JSR Corporation, are cited as preferable examples.

Further, it is preferable that a material which forms the objective lens has the Abbe number of 50 or more.

Next, the objective lens will be described below from the viewpoint of an optical design.

At least one optical surface of the objective lens includes at least a central area, an intermediate area surrounding the central area, and a peripheral area surrounding the intermediate area. It is preferable that the central area includes the optical axis of the objective lens. However, a small area including the optical axis may be provided as an unused area or an area for a special purpose, and the central area may be provided to surround the small area. The central area, intermediate area, and peripheral area are preferably formed on one optical surface. As shown in FIG. 1, it is preferable that the central area CN, intermediate area MD, peripheral area OT are provided on the same optical surface concentrically around the optical axis. Further, a first optical path difference providing structure is provided in the central area of the objective lens. A second optical path difference providing structure is provided in the intermediate area. The peripheral area may be a refractive surface, or a third optical path difference providing structure may be provided in the peripheral area. It is preferable that each of the central area, intermediate area, and peripheral area adjoins to the neighboring area, however, there may be slight gaps between the neighboring areas.

The central area of the objective lens can be considered as a common area for the first, second and third optical discs to be used for recording and/or reproducing information for the first optical disc, the second optical disc, and the third optical disc. In other words, the objective lens converges a first light flux that passes through the central area on an information recording surface of the first optical disc so that recording and/or reproducing of information may be conducted on the information recording surface of the first optical disc, converges a second light flux that passes through the central area on an information recording surface of the second optical disc so that recording and/or reproducing of information may be conducted on the information recording surface of the second optical disc, and converges a third light flux that passes through the central area on an information recording surface of the third optical disc so that recording and/or reproducing of information may be conducted on the information recording surface of the third optical disc. Further, it is preferable that the first optical path difference providing structure arranged in the central area corrects spherical aberration caused by a difference between thickness t1 of a protective substrate of the first optical disc and thickness t2 of a protective substrate of the second optical disc, and/or spherical aberration caused by a difference in wavelength between the first light flux and the second light flux, for the first light flux and the second light flux both passing through the first optical path difference providing structure. Further, it is preferable that the first optical path difference providing structure corrects spherical aberration caused by a difference between thickness t1 of a protective substrate of the first optical disc and thickness t3 of a protective substrate of the third optical disc and/or spherical aberration caused by a wavelength difference between the first light flux and the third light flux, for the first light flux and the third light flux.

An intermediate area of the objective lens can be considered as a common area for the first and second optical discs which are used for recording and/or reproducing for the first optical disc and the second optical disc, but are not used for recording and/or reproducing for the third optical disc. In other words, the objective lens converges the first light flux that passes through the intermediate area on an information recording surface of the first optical disc so that recording and/or reproducing of information may be conducted on the information recording surface of the first optical disc, and converges the second light flux that passes through the intermediate area on an information recording surface of the second optical disc so that recording and/or reproducing of information may be conducted on the information recording surface of the second optical disc. On the other hand, the objective lens does not converge the third light flux that passes through the intermediate area on an information recording surface of the third optical disc so that recording and/or reproducing of information may be conducted on the information recording surface of the third optical disc. It is preferable that the third light flux that passes through the intermediate area of the objective lens forms flare light on an information recording surface of the third optical disc. As shown in FIG. 2, when a spot is formed by the third light flux that has passed through the objective lens onto an information recording surface of the third optical disc, the spot preferably includes a central spot portion SCN whose light density is high, an intermediate spot portion SMD whose light density is lower than that in the central spot portion, and a peripheral spot portion SOT whose light density is higher than that in the intermediate spot portion and is lower than that in the central spot portion. The central spot portion is used for recording and/or reproducing of information of an optical disc, while, the intermediate spot portion and the peripheral spot portion are not used for recording and/or reproducing of information of the optical disc. In the foregoing, the peripheral spot portion is called flare light. However, also in the case that the spot includes just the central spot portion and the peripheral spot portion but does not include the intermediate spot portion around the central spot portion, namely, in the case that a spot which is large in size and has weak light intensity is formed around a converged spot, the peripheral spot portion can be called a flare light. In other words, it can be said that it is preferable that the third light flux forms a peripheral spot portion on an information recording surface of the third optical disc.

A peripheral area of the objective lens can be considered as an exclusive area for the first optical disc that is used for recording and/or reproducing for the first optical disc but is not used for recording and/or reproducing for the second optical disc and the third optical disc. In other words, the objective lens converges a first light flux that passes through the peripheral area on an information recording surface of the first optical disc so that recording and/or reproducing of information may be conducted on the information recording surface of the first optical disc. On the other hand, the objective lens does not converge the second light flux that passes through the peripheral area on an information recording surface of the second optical disc so that recording and/or reproducing of information may be conducted on the information recording surface of the second optical disc, and it does not converge the third light flux that passes through the peripheral area on an information recording surface of the third optical disc so that recording and/or reproducing of information may be conducted on the information recording surface of the third optical disc. It is preferable that the second light flux and the third light flux which pass through the peripheral area of the objective lens form flare light on the information recording surfaces of the second and third optical discs. In other words, it is preferable that the second light flux and the third light flux which have passed the peripheral area of the objective lens form the peripheral spot portion.

It is preferable that first optical path difference providing structures are provided on the area that is 70% or more of the central area of the objective lens, and it is more preferable that the area for the first optical path difference providing structures is 90% or more. What is more preferable is that the first optical path difference providing structures are provided on the whole surface of the central area. It is preferable that second optical path difference providing structures are provided on the area that is 70% or more of the intermediate area of the objective lens, and it is more preferable that the area for the second optical path difference providing structures is 90% or more. What is more preferable is that the second optical path difference providing structures are provided on the whole surface of the intermediate area. When the peripheral area has thereon the third optical path difference providing structure, it is preferable that third optical path difference providing structures are provided on the area that is 70% or more of the peripheral area of the objective lens, and it is more preferable that the area for the third optical path difference providing structures is 90% or more. What is more preferable is that the third optical path difference providing structures are provided on the whole surface of the peripheral area.

Optical Path Difference Providing Structure:

Incidentally, the optical path difference providing structure mentioned in the present specification is a general term for the structure that provides an optical path difference to an incident light flux. The optical path difference providing structure also includes a phase difference providing structure that provides a phase difference. Further, the phase difference providing structure includes a diffractive structure. It is preferable that the optical path difference providing structure of the present invention is a diffractive structure. The optical path difference providing structure comprises a step difference, and it preferably comprises a plurality of step differences. Due to the step difference or step differences, an optical path difference and/or a phase difference is provided to an incident light flux. An optical path difference to be provided by the optical path difference providing structure may either be a multiple of an integer of a wavelength of an incident light flux in terms of a length or be a multiple of a non-integer of a wavelength of an incident light flux. The step differences may either be arranged with intervals periodically in the direction perpendicular to the optical axis, or be arranged with interval non-periodically in the direction perpendicular to the optical axis. When the objective lens equipped with an optical path difference providing structure is an aspheric single lens, an incident angle of a light flux for the objective lens varies depending on a height from the optical axis, thus, an amount of a step difference of the optical path difference providing structure is slightly different from others for each ring-shaped zone. For example, when the objective lens is a convex single lens with an aspheric surface, it is a general trend that an amount of step difference of the optical path difference providing structure grows greater as a position in the optical path difference providing structure becomes more distant from the optical axis, even in the case of the optical path difference providing structure that provides the constant optical path difference.

Further, a diffractive structure mentioned in the present specification is a general term for a structure that comprises a step difference or step differences, for providing a function to converge a light flux or to diverge a light flux by a diffraction effect. For example, a diffractive structure can be formed by plural unit forms which are arranged around the optical axis, such that, when a light flux enters the respective unit forms, a wavefront of the transmitted light flux is shifted at every adjoining ring-shaped zone to form a new wavefront by which light is converged or diverged. The diffractive structure preferably includes plural step differences, and the step differences may either be arranged with intervals periodically in the direction perpendicular to the optical axis, or be arranged with intervals non-periodically in the direction perpendicular to the optical axis. When an objective lens with a diffractive structure is provided as an aspheric single lens, an angle of a light flux entering the objective lens varies depending on a height from the optical axis. Thereby, an amount of step difference of the diffractive structure slightly varies on each ring-shaped zone. For example, when the objective lens is a convex single lens including an aspheric surface, it is a general trend that an amount of step difference grows greater as a position of the step difference is more distant from the optical axis, even in a diffractive structure which generates a diffracted light fluxes with the same diffraction order.

Incidentally, it is preferable that an optical path difference providing structure comprises a plurality of ring-shaped zones which are formed in concentric circles whose centers are on the optical axis. Further, the optical path difference providing structure can take generally various sectional forms (sectional forms on the surface including an optical axis) which are classified roughly into a blaze-type structure and a step-type structure in terms of a sectional form including the optical axis.

The blaze-type structure has a form whose sectional form including the optical axis of an optical element having an optical path difference providing structure are in a serrated form, as shown in FIGS. 3a and 3b. In the example shown in FIGS. 3a and 3b, it is assumed that the upward of the sheet is the light source side, and the downward of the sheet is the optical disc side, and that the optical path difference providing structure is formed on a plane representing a base aspheric surface. In the blaze-type structure, a length of one blaze unit in the direction perpendicular to the optical axis is called pitch P (see FIGS. 3a and 3b). Further, a length of a step difference in the direction that is in parallel with the optical axis of blaze is called step difference amount B (see FIG. 3a).

The step-type structure has a form whose sectional form including an optical axis of an optical element having an optical path difference providing structure has a plurality of small-step units (each being called a step unit), as shown in FIGS. 3c and 3d. Incidentally, "V-level" mentioned in the present specification means a form such that one step unit of the step-type structure has ring-shaped surfaces (which is sometimes called terrace surfaces) that correspond to a perpendicular direction to the optical axis (that extend in the perpendicular direction to the optical axis), where the ring-shaped surfaces are formed by being sectioned by the step differences and are separated at every plural ring-shaped surfaces which are V in number. Especially, a step-type structure of 3 levels or more includes small step differences and large step differences.

For example, an optical path difference providing structure shown in FIG. 3c is called a 5-level step-type structure and an optical path difference providing structure shown in FIG. 3d is called a 2-level step-type structure (which is called also binary structure). A 2-level step-type structure will be explained as follows. The 2-level step-type structure includes ring-shaped zones in concentric ringed shape around the optical axis. The cross sectional form including the optical axis of the plural ring-shaped zones is provided with plural step difference surfaces Pa and Pb extending parallel with the optical axis, light-source-side terrace surfaces Pc each connecting light-source-side ends of the neighboring step difference surfaces Pa and Pb, and optical-disc-side terrace surfaces Pd each connecting optical-disc-side ends of the neighboring step difference surfaces Pa and Pb. The light-source-side terrace surfaces Pc and the optical-disc-side terrace surfaces Pd are arranged alternately along a direction crossing the optical axis.

Further, in the step-type structure, a length of one step unit in the direction perpendicular to the optical axis is called pitch P (see FIGS. 3c and 3d). Further, a length of a step difference in the direction that is in parallel with the optical axis is called step difference amount B1 and step difference amount B2. In the case of the step-type structure of 3 levels or more, large step difference amount B1 and small step difference amount B2 are in existent (see FIG. 3c).

Incidentally, it is preferable that an optical path difference providing structure is a structure wherein certain unit forms repeat themselves periodically. The expression saying "certain unit forms repeat themselves periodically" in this case naturally includes a form wherein the same forms repeat themselves at the same period. Further, the expression saying "certain unit forms repeat themselves periodically" in this case also includes a form wherein its period becomes gradually longer or becomes gradually shorter with regularity.

When an optical path difference providing structure has a blaze-type structure, it has a form that serrated forms representing unit forms repeat themselves. The optical path difference providing structure may have a form that the same serrated forms repeat themselves as shown in FIG. 3a, or has a shape that the pitch of a serrated form becomes gradually longer or shorter at a position that advances to be further from the optical axis, as shown in FIG. 3b. In addition, the optical path difference providing structure may have a form that step differences of the blaze-type structure faces the direction opposite to the optical axis (center) in a certain area, and step differences of the blaze-type structure faces the optical axis (center) in the other area, and that a transition area is provided for switching the direction of the step differences of the blaze-type structure. Incidentally, when employing a structure to switch the direction of the step differences of the blaze-type structure on the midway as stated above, it becomes possible to enlarge pitches of the ring-shaped zones and to control a decline of transmittance that is caused by manufacturing errors for the optical path difference providing structure.

When an optical path difference providing structure has a step-type structure, the structure can have a form in which 5-level step units as shown in FIG. 3c repeat themselves. Further, the structure may have a form in which pitches of step units become gradually longer or shorter at a position that advances to be further from the optical axis.

Further, the first optical path difference providing structure and the second optical path difference providing structure may be formed on different optical surfaces of the objective lens, respectively. However, the first optical path difference providing structure and the second optical path difference providing structure are preferably formed on the same optical surface. When the third optical path difference providing structure is further provided, it is preferable that the third optical path difference providing structure is formed on the same optical surface on which the first optical path difference providing structure and the second optical path difference providing structure are formed. By providing them on the same optical surface, it is possible to reduce decentration errors in manufacturing process, which is preferable. Further, it is preferable that the first optical path difference providing structure, the second optical path difference providing structure and the third optical path difference providing structure are provided on the surface of the objective lens facing the light-source side, rather than the surface of the objective lens facing the optical-disc side. In another expression, it is preferable that the first optical path difference providing structure, the second optical path difference providing structure and the third optical path difference providing structure are provided on the optical surface of the objective lens which has a smaller absolute value of the curvature radius.

First Optical Path Difference Providing Structure:

Next, the first optical path difference providing structure provided on the central area will be explained.

First, the first optical path difference providing structure can be classified into two large embodiment groups.

A first embodiment group of the first optical path difference providing structure includes embodiments that the first optical path difference providing structure has a structure formed by overlapping plural basic structures. Herein, each of the basic structures is an optical path difference providing structure. There are cited an embodiment that a first basic structure and a second basic structure are overlapped together to form the first optical path difference providing structure, and an embodiment that a first basic structure, a second basic structure and a third basic structure are overlapped together to form the first optical path difference providing structure.

Next, a second embodiment group of the first optical path difference providing structure includes an embodiment that the first optical path difference providing structure composed of only a single basic structure.

Hereinafter, two embodiments which are especially preferable embodiments (Embodiment 1-1, Embodiment 1-2) in the first embodiment group of the first optical path difference providing structure, and one embodiment which is an especially preferable embodiment (Embodiment 2-1) in the second embodiment group of the first optical path difference providing structure, will be described.

(Embodiment 1-1)

The present embodiment is characterized in that at least a first basic structure being a blaze-type structure and a second basic structure being a blaze-type structure are overlapped together. More preferable conditions of the present embodiment will be described below.

The first basic structure as a blaze-type structure emits a Xth-order diffracted light flux with a larger light amount than diffracted light fluxes with any other diffraction orders, when the first light flux passes through the first basic structure, emits a Yth-order diffracted light flux with a larger light amount than diffracted light fluxes with any other diffraction orders, when the second light flux passes through the first basic structure, and emits a Zth-order diffracted light flux with a larger light amount than diffracted light fluxes with any other diffraction orders, when the third light flux passes through the first basic structure. In this case, the value of X is preferably an odd integer. When the value of X is an odd number whose absolute value is 5 or less, a step difference amount of the first basic structure does not become too great, resulting in easy manufacture, thus, it is possible to control a loss of light amount caused by manufacturing errors and to decrease fluctuations of diffraction efficiency in the case of wavelength fluctuations, which is preferable.

Further, in at least a part of the first basic structure arranged around the optical axis in the central area, a step difference or step differences preferably face the opposite direction to the optical axis. The expression saying that "a step or steps face the opposite direction to the optical axis" means the situation shown in FIG. 4b. Further, "at least a part of the first basic structure arranged around the optical axis in the central area" means at least a step difference positioned closest to the optical axis among step differences wherein the value of X is an odd number. Preferably, at least step differences existing in space from the optical axis to a position of a half of a distance from the optical axis to a boundary between the central area and the intermediate area, wherein the value of X is an odd number, face the direction opposite to the optical axis.

For example, a part of the first basic structure in the central area, which is located close to the intermediate area, may have step differences facing the optical axis. Namely, as shown in FIG. 5b, the first basic structure may have a form that step differences positioned around the optical axis face the opposite direction to the optical axis, then, the direction of the step differences switches on the midway, and step differences positioned around the intermediate area face the optical axis. It is preferable that all the step differences of the first basic structure arranged in the central area face the opposite direction to the optical axis.

By providing step differences of the first basic structure in which a diffraction order of the first light flux is an odd number and by arranging the step differences to face the direction opposite to the optical axis, it is possible that sufficient working distance is secured when an objective lens works for a CD, even in a thick objective lens having a thick axial thickness used for achieving the compatibility of three types of optical disc of BDs, DVDs and CDs.

Even in a thick objective lens having a thick axial thickness used for achieving the compatibility of three types of optical disc of BDs, DVDs and CDs, it is preferable that the first basic structure has a paraxial power for the first light flux, from the viewpoint of securing a working distance sufficiently when the objective lens works for a CD. When an optical path difference function of the first basic structure is expressed by Math 2 described later, the expression saying that "having a paraxial power" means that $C_2h^2$ is not 0.

The second basic structure as a blaze-type structure emits a Lth-order diffracted light flux with a larger light amount than diffracted light fluxes with any other diffraction orders, when the first light flux passes through the second basic structure, emits a Mth-order diffracted light flux with a larger light amount than diffracted light fluxes with any other diffraction orders, when the second light flux passes through the second basic structure, and emits a Nth-order diffracted light flux with a larger light amount than diffracted light fluxes with any other diffraction orders, when the third light flux passes through the second basic structure. In this case, the value of L is the even integer. When the value of L is an even number whose absolute value is 4 or less, a step difference amount of the second basic structure does not become too great, resulting in easy manufacture, thus, it is possible to control a loss of light amount caused by manufacturing errors can be controlled, and fluctuations of diffraction efficiency caused by wavelength fluctuations can be lowered, which is preferable.

Further, in at least a part of the second basic structure arranged around the optical axis in the central area, a step difference or step differences preferably face the optical axis. The expression saying that "a step difference or step differences face the optical axis" means the situation shown in FIG. 4a. Further, "at least a part of the second basic structure arranged around the optical axis in the central area" means at least a step difference positioned closest to the optical axis among step differences wherein the value of L is an even number. Preferably, at least step differences existing in a space from the optical axis to a position of a half of a distance from the optical axis to a boundary between the central area and the intermediate area, wherein the number of L is an even number, face the direction opposite to the optical axis.

For example, a part of the second basic structure in the central area, which is located close to the intermediate area, may have step differences facing the opposite direction to the optical axis. Namely, as shown in FIG. 5a, the second basic structure may have a form that step differences positioned around the optical axis face the optical axis, then, the direction of the step differences switches on the midway, and step differences positioned around the intermediate area face the opposite direction to the optical axis. It is preferable that all the step differences of the second basic structure arranged in the central area face the optical axis.

As stated above, by overlapping the first basic structure and the second basic structure together, where the first basic structure generates a diffracted light with odd diffraction order for the first light flux and includes step differences facing the opposite direction to the optical axis in at least a space around the optical axis in the central area, and the second basic structure generates a diffracted light with even diffraction order for the first light flux and includes step differences facing the optical axis in at least a space around the optical axis in the central area, the following effects can be obtained. By overlapping these step differences together, the height of step differences measured after the step differences are overlapped together can be controlled not to be excessive high when compared with the situation that step differences of the first basic structure and step differences of the second basic structure are overlapped together to face the same direction. Accordingly, it enables to restrict loss of light amount caused due to manufacturing error and enables to restrict a fluctuation of a diffraction efficiency caused when a wavelength changes.

It is possible to provide an objective lens which enables compatibility of three types of optical discs of three types of BDs, DVDs and CDs, and further possible to provide an objective lens with well-balanced light utilizing efficiency so as to maintain high light utilizing efficiency for each of the three types of optical disc of BDs, DVDs, and CDs. For example, it is possible to provide an objective lens wherein a diffraction efficiency for wavelength λ1 is 80% or more, a diffraction efficiency for wavelength λ2 is 60% or more and a diffraction efficiency for wavelength λ3 is 50% or more, from the point of view of design. Further, it is possible to provide an objective lens wherein a diffraction efficiency for wavelength λ1 is 80% or more, a diffraction efficiency for wavelength λ2 is 70% or more and a diffraction efficiency for wavelength λ3 is 60% or more. In addition, by providing a step difference or step differences facing the opposite direction to the optical axis in the first basic structure, an aberration caused when a wavelength of an incident light changed to be longer, can be changed toward under-corrected (deficient correction) direction. Thereby, an aberration caused when a temperature of an optical pickup device raises can be controlled to be small, which enables to provide an objective lens capable of maintaining a stable performance even under a temperature change, when plastic is employed for the material of the objective lens.

For maintaining stable properties even under the temperature change, when the objective lens is made of plastic, it is preferable that the third order spherical aberration and fifth order spherical aberration caused in the objective lens when a wavelength of the incident light flux becomes longer, are under-corrected (deficient correction).

The more preferable first optical path difference providing structure is formed by overlapping the first basic structure in which |X|, |Y| and |Z| are respectively 1, 1 and 1 and the second basic structure in which |L|, |M| and |N| are respectively 2, 1 and 1, together. Such the first optical path difference providing structure can have very low step differences. Therefore, manufacturing errors can be reduced, and loss in light amount can further be controlled, thus, fluctuations of diffraction efficiency caused by wavelength fluctuations can be controlled to more excellent condition.

From the viewpoint of a form and a step difference amount of the first optical path difference providing structure in which the first basic structure and the second basic structure has been overlapped with each other, the first optical path difference providing structure wherein the first basic structure in which |X|, |Y| and |Z| are respectively 1, 1 and 1, and the second basic structure in which |L|, |M| and |N| are respectively 2, 1 and 1 are overlapped together, can be expressed as follows. It is preferable that at least a part of the first optical path difference providing structure arranged around the optical axis in the central area includes both of a step difference facing an opposite direction to the optical axis and a step facing the optical axis. The amount of each of the step differences preferably satisfies the following expressions (6) and (7), where d11 is an amount of the step difference facing the opposite direction to the optical axis, and d12 is an amount of the step difference facing the optical axis. More preferably, the following expressions (6) and (7) are satisfied in the whole of the central area. When an objective lens equipped with an optical path difference providing structure is a convex single lens with an aspheric surface, an incident angle of a light flux entering the objective lens varies depending on a height from the optical axis, which results in a trend wherein a step difference amount grows greater in general at a position located further from the optical axis. The reason why the upper limit is multiplied by 1.5 in the following expressions is because an increase of the step difference amount is taken into account. In the expression, n is a refractive index of the objective lens at the wavelength $\lambda 1$.

$$0.6 \cdot (\lambda 1/(n-1)) < d11 < 1.5 \cdot (\lambda 1/(n-1)) \tag{6}$$

$$0.6 \cdot (\lambda 1/(n-1)) < d12 < 1.5 \cdot (2\lambda 1/(n-1)) \tag{7}$$

Incidentally, "at least a part of the first optical path difference providing structure arranged around the optical axis in the central area" means an optical path difference providing structure including both of at least a step difference located closest the optical axis and facing the direction opposite to the optical axis, and a step difference located closest to the optical axis and facing the direction of the optical axis. Preferably, it is an optical path difference providing structure including at least the step differences existing in a space from the optical axis to a position of a half of a distance from the optical axis to a boundary between the central area and the intermediate area.

For example, when $\lambda 1$ is 390-415 nm (0.390 to 0.415 μm), and n is 1.54-1.60, the above expressions can be expressed as follows.

$$0.39 \, \mu m < d11 < 1.15 \, \mu m \tag{8}$$

$$0.39 \, \mu m < d12 < 2.31 \, \mu m \tag{9}$$

Further, with respect to the way to overlap the first basic structure and the second basic structure together, it is preferable that the pitches of the first basic structure and the pitches of the second basic structure are adjusted such that all the step differences of the second basic structure are located at the same positions to step differences of the first basic structure, or such that all the step differences of the first basic structure are located at the same positions to step differences of the second basic structure.

When positions of all the step differences of the second basic structure are adjusted to positions of step differences of the first basic structure as stated above, it is preferable that d11 and d12 of the first optical path difference providing structure satisfy respectively the following expressions (6') and (7'). It is more preferable that the following expressions (6') and (7') are satisfied in the whole of the central area.

$$0.6 \cdot (\lambda 1/(n-1)) < d11 < 1.5 \cdot (\lambda 1/(n-1)) \tag{6'}$$

$$0.6 \cdot (\lambda 1/(n-1)) < d12 < 1.5 \cdot (\lambda 1/(n-1)) \tag{7'}$$

Further, for example, when $\lambda 1$ is 390-415 nm (0.390 to 0.415 μm) and n is 1.54-1.60, the expressions above can be expressed as follows.

$$0.39 \, \mu m < d11 < 1.15 \, \mu m \tag{8'}$$

$$0.39 \, \mu m < d12 < 1.15 \, \mu m \tag{9'}$$

It is more preferable that the following expressions are satisfied. It is further more preferable that the following expressions (6") and (7") are satisfied in the whole of the central area.

$$0.9 \cdot (\lambda 1/(n-1)) < d11 < 1.5 \cdot (\lambda 1/(n-1)) \tag{6"}$$

$$0.9 \cdot (\lambda 1/(n-1)) < d12 < 1.5 \cdot (\lambda 1/(n-1)) \tag{7"}$$

Further, for example, $\lambda 1$ is 390-415 nm (0.390 to 0.415 μm) and n is 1.54-1.60, the expressions above can be expressed as follows.

$$0.59 \, \mu m < d11 < 1.15 \, \mu m \tag{8"}$$

$$0.59 \, \mu m < d12 < 1.15 \, \mu m \tag{9"}$$

By providing a first optical path difference providing structure formed by overlapping the first basic structure wherein |X|, |Y| and |Z| are respectively 1, 1 and 1 and the second basic structure wherein |L|, |M| and |N| are respectively 2, 1 and 1, together, the first basic structure can exhibit under-corrected (deficient correction) aberration when the wavelength of the incident light flux becomes longer, and the second basic structure can exhibit over-corrected (excessive correction). Such the structure do not exhibit wavelength characteristic which is excessively under-corrected or is excessively over-corrected, but exhibit wavelength characteristic which is under-corrected to a proper degree. As for the "wavelength characteristic which is under-corrected to a proper degree", it is preferable that an absolute value of $\lambda$ rms is 150 or less. Due to this, it is possible to control aberration change caused by temperature change to be small even in the case when an objective lens is made of plastic, which is preferable from a point of view of the foregoing.

From the viewpoint of obtaining "wavelength characteristic which is under-corrected to a proper degree" as stated above, it is preferable that contribution of the first basic structure is dominant compared with the second basic structure. From a point of view to make contribution of the first basic structure to be dominant over the second basic structure, it is preferable that an average pitch of the first basic structure is smaller than that of the second basic structure. In other expressions, it is possible to express that pitches of step differences facing the direction opposite to the optical axis are smaller than pitches of step differences facing the optical axis, or it is possible to express that the number of step differences facing the direction opposite to the optical axis is more than the number of step differences facing the optical axis, in the first optical path difference providing structure. Incidentally, it is preferable that an average pitch of the first basic structure is one-fourth or less of an average pitch of the second basic structure. It is more preferable that an average pitch of the first basic structure is one-sixth or less of an average pitch of the second basic structure. By making an average pitch of the first basic structure to be one-fourth (or one-sixth, preferably) of an average pitch of the second basic structure, it is possible to make wavelength characteristics to be "under-corrected to a proper degree", and it is also preferable from a point of view to secure sufficient working distance in the case of a CD. In other expressions, it is possible to express that it is preferable that the number of step differences facing the direction opposite to the optical axis is four times or more the number of step differences facing the optical axis, in the first optical path difference providing structure in the central area Six times or more is more preferable.

Further, it is preferable that a minimum pitch of the first optical path difference providing structure is 15 μm or less. The minimum pitch of 10 μm or less is more preferable. It is preferable that an average pitch of the first optical path difference providing structure is 30 μm or less. It is more preferable that the average pitch is 20 μm or less. By providing such the structure, it is possible to obtain wavelength characteristics to be under-corrected to a proper degree as stated above, and it is possible to keep a best focus position for necessary light used for recording and/or reproducing information for the third optical disc and a best focus position for unwanted light that is not used for recording and/or reproducing information for the third optical disc to be away from each other, and detection error can be reduced. Meanwhile, an average pitch is a value obtained by adding all pitches of the first optical path difference providing structure in the central area and by dividing it by the number of step differences of the first optical path difference providing structure in the central area.

As for the third light flux that has passed through the first optical path difference providing structure, it is preferable that a first best focus position where light intensity of a spot formed by the third light flux is strongest and a second best focus position where light intensity of a spot formed by the third light flux is second strongest satisfy the following conditional expression (10). Meanwhile, the best focus position mentioned in this case is one that indicates a position where a beam waist becomes a minimum in a certain defocusing range. The first best focus position is a best focus position for necessary light used for recording and/or reproducing for the third optical disc, and the second best focus position is a best focus position for a light flux having the largest amount of light amount among unwanted light fluxes which are not used for recording and/or reproducing for the third optical disc.

$$0.05 \leq L/f3 \leq 0.35 \quad (10)$$

In the expression above, f3 (mm) is a focal length of the third light flux that passes through the first optical path difference providing structure and forms a first best focus, and L (mm) indicates a focal length between the first best focus and the second best focus.

It is more preferable that the following conditional expression (10') is satisfied.

$$0.10 \leq L/f3 \leq 0.25 \quad (10')$$

A preferable example of the first optical path difference providing structure explained above is shown in FIG. 6. However FIG. 6 shows a structure that the first optical path difference structure ODS1 is provided on a flat plate for convenience, the actual first optical path difference structure is provided on a convex single lens with an aspheric surface. The first basic structure BS1 wherein |X|, |Y| and |Z| are respectively 1, 1 and 1 is overlapped with the second basic structure BS2 wherein |L|, |M| and |N| are respectively 2, 1 and 1. Step differences of the second basic structure BS2 face the direction of optical axis OA, and step differences of the first basic structure BS1 face the direction opposite to the optical axis OA. As can be seen from the figure, the pitches of the first basic structure BS1 and the pitches of the second basic structure BS2 are adjusted such that all the step differences of the second basic structure are located at the same positions to step differences of the first basic structure. In the present example, d1=λ1/(n−1) holds and d2=λ1/(n−1) holds. In the present example, when λ1=405 nm (0.405 μm) and n=1.5592 hold, d1=d2=0.72 μm holds. In the present example, an average pitch of the first basic structure BS1 is smaller than that of the second basic structure BS2, and the number of step differences facing the direction opposite to the optical axis of the first basic structure is more than that of step differences facing the optical axis of the second basic structure.

Next, Embodiment 2-1 will be described.
(Embodiment 2-1)

The present embodiment is characterized in that at least a first basic structure being a blaze-type structure and a second basic structure being a step-type structure as plural basic structures are overlapped together. Preferable conditions of the present invention will be described below.

The first basic structure as a blaze-type structure emits a Xth-order diffracted light flux with a larger light amount than diffracted light fluxes with any other diffraction orders, when the first light flux passes through the first basic structure, emits a Yth-order diffracted light flux with a larger light amount than diffracted light fluxes with any other diffraction orders, when the second light flux passes through the first basic structure, and emits a Zth-order diffracted light flux with a larger light amount than diffracted light fluxes with any other diffraction orders, when the third light flux passes through the first basic structure. In this case, the values of X, Y and Z are preferably 2, 1, 1, respectively. Thereby, a step difference amount of the first basic structure does not become too great, resulting in easy manufacture, thus, it is possible to control a loss of light amount caused by manufacturing errors and to decrease fluctuations of diffraction efficiency in the case of wavelength fluctuations, which is preferable.

Further, in at least a part of the first basic structure arranged around the optical axis in the central area, a step difference or step differences preferably face the direction of the optical axis. Preferably, at least step differences existing in a space from the optical axis to a position of a half of a distance from the optical axis to a boundary between the central area and the intermediate area, wherein the values of X, Y and Z are 2, 1 and 1, respectively, face the direction of the optical axis. More preferably, all the steps of the first basic structure arranged on the central area face the direction of the optical axis.

The second basic structure being a step-type structure emits a Lth-order diffracted light flux with a larger light amount than diffracted light fluxes with any other diffraction orders, when the first light flux passes through the second basic structure, emits a Mth-order diffracted light flux with a larger light amount than diffracted light fluxes with any other diffraction orders, when the second light flux passes through the second basic structure, and emits a Nth-order diffracted light flux with a larger light amount than diffracted light fluxes with any other diffraction orders, when the third light flux passes through the second basic structure. In this case, the values of L, M and N are preferably 0, 0, ±1, respectively. The condition that the value of N is ±1 means that one of the +first order diffracted light of the third light flux which has passed through the second basic structure and the −first order diffracted light of the third light flux with has passed through the second basic structure has the maximum light amount and the other has the second maximum light amount.

Such the second basic structure becomes two-level step-type structure as shown in FIG. 3d.

The first basic structure can provide different aberrations for the first light flux and the second light flux from each other, and can hardly provide different aberrations for the first light flux and the third light flux. To solve that, by using the second basic structure, different aberrations are provided with only the third light flux without affecting the first light flux and the second light flux. Thus, the structure wherein the first basic structure and the second basic structure are overlapped together can provide different aberrations for all the first light flux, the second light flux and the third light flux.

Further, this embodiment can provide an objective lens which enables not only to achieve compatibility of three-types of optical disc of a BD, a DVD and a CD, but also to obtain very high light utilization effects especially for a BD and a DVD. For example, it is possible to provide an objective lens which achieves a diffraction efficiency of 90% or more for wavelength $\lambda 1$, and a diffraction efficiency of 80% or more for wavelength $\lambda 2$. Further, it is possible to provide an objective lens which achieves a diffraction efficiency of 95% or more for wavelength $\lambda 1$, and a diffraction efficiency of 90% or more for wavelength $\lambda 2$.

From the viewpoint of the shape and the step difference amount of the first optical path difference providing structure obtained after the first basic structure and the second basic structure are overlapped together, the first optical path difference providing structure wherein the first basic structure with $|X|$, $|Y|$ and $|Z|$ being 2, 1 and 1, respectively and the second basic structure with $|L|$, $|M|$ and $|N|$ being 0, 0 and 1, respectively are overlapped together can be represented as follows. Herein, when the objective lens on which an optical path difference providing structure is arranged is a single convex lens with an aspheric surface, an incident angle of a light flux at an objective lens depends on the height from the optical axis. Therefore, such lens has a trend that the step difference amount becomes greater at a position farther from the optical axis generally, comparing with an optical path difference providing structure providing the same optical path difference. In the following expressions, the upper limit is multiplied by 1.5 because the increase of the step difference amount is considered. The step difference amount of the first optical path difference providing structure of the present embodiment preferably includes at least two kinds out of the following dA, dB, dC and dD.

$$0.9 \cdot (15\lambda B/(n-1) - 2\lambda B'/(n'-1)) < dA \, (\mu m) < 1.5 \cdot (15\lambda B/(n-1) - 2\lambda B'/(n'-1)) \quad (11)$$

$$0.9 \cdot (5\lambda B/(n-1) + 2\lambda B'/(n'-1)) < dB \, (\mu m) < 1.5 \cdot ((5\lambda B/(n-1) + 2\lambda B'/(n'-1)) \quad (12)$$

$$0.9 \sim 5\lambda B/(n-1) < dC \, (\mu m) < 1.5 \times 5\lambda B/(n-1) \quad (13)$$

$$0.9 \cdot (5\lambda B/(n-1) - 2\lambda B'/(n'-1)) < dD \, (\mu m) < 1.5 \cdot (5\lambda B/(n-1) - 2\lambda B'/(n'-1)) \quad (14)$$

Where, the above conditional expression (11) is preferable to be the following expression (11').

$$0.95 \cdot (15\lambda B/(n-1) - 2\lambda B'/(n'-1)) < dA \, (\mu m) < 1.4 \cdot (15\lambda B/(n-1) - 2\lambda B'/(n'-1)) \quad (11')$$

Further, the above conditional expression (11) is more preferable to be the following expression (11'').

$$1.0 \cdot (15\lambda B/(n-1) - 2\lambda B'/(n'-1)) \leq dA \, (\mu m) < 1.3 \cdot (15\lambda B/(n-1) - 2\lambda B'/(n'-1)) \quad (11'')$$

Where, the above conditional expression (12) is preferable to be the following expression (12').

$$0.95 \cdot (5\lambda B/(n-1) + 2\lambda B'/(n'-1)) < dB \, (\mu m) < 1.4 \cdot ((5\lambda B/(n-1) + 2\lambda B'/(n'-1)) \quad (12')$$

Further, the above conditional expression (12) is more preferable to be the following expression (12'').

$$1.0 \cdot (5\lambda B/(n-1) + 2\lambda B'/(n'-1)) \leq dB \, (\mu m) < 1.4 \cdot ((5\lambda B/(n-1) + 2\lambda B'/(n'-1)) \quad (12'')$$

Where, the above conditional expression (13) is preferable to be the following expression (13').

$$0.95 \cdot 5\lambda B/(n-1) < dC \, (\mu m) < 1.4 \cdot 5\lambda B/(n-1) \quad (13')$$

Further, the above conditional expression (13) is more preferable to be the following expression (13'').

$$1.0 \cdot 5\lambda B/(n-1) \leq dC \, (\mu m) < 1.3 \cdot 5\lambda B/(n-1) \quad (13'')$$

Where, the above conditional expression (14) is preferable to be the following expression (14').

$$0.95 \cdot (5\lambda B/(n-1) - 2\lambda B'/(n'-1)) < dD \, (\mu m) < 1.4 \cdot (5\lambda B/(n-1) - 2\lambda B'/(n'-1)) \quad (14')$$

Further, the above conditional expression (14) is more preferable to be the following expression (14'').

$$1.0 \times (5\lambda B/(n-1) - 2\lambda B'/(n'-1)) \leq dD \, (\mu m) < 1.3 \times (5\lambda B/(n-1) - 2\lambda B'/(n'-1)) \quad (14'')$$

Where, $\lambda B$ represents a design wavelength ($\mu m$) of the first light flux; $\lambda B'$ represents an arbitral value which is 0.390 ($\mu m$) or more, and is 0.405 ($\mu m$) or less; n represents a refractive index of the objective optical element for the design wavelength $\lambda B$; and n' represents a refractive index of the objective optical element for a wavelength $\lambda B'$.

It is preferable that the value of $\lambda B$ is preferable to be the wavelength of the first light source installed in the optical pickup device. It is preferable that the value of $\lambda B'$ is an arbitral value which is 0.390 ($\mu m$) or more, and is 0.400 ($\mu m$) or less.

In the specification, the step difference amount means a length of a step difference in an optical path difference providing structure in the direction of the optical axis. For example, when the optical path difference providing structure is the structure shown in FIG. 7, the step difference amount represents each length of d1, d2, d3, and d4. "The step differences in the first optical path difference providing structure have at least two kinds of step amounts selected from dA, dB, dC, and dD" means that at least one step difference x in all the step differences in the first optical path difference providing structure has the step difference amount satisfying any one of dA, dB, dC, and dD, and at least another step difference y has the step difference amount satisfying any one of dA, dB, dC, and dD, which differs from the step difference amount of the step difference x.

It is preferable that there is no step difference having the step difference amount satisfying other than dA, dB, dC, and dD in the first optical path difference providing structure. It is further preferable that the step difference amount is not excessively large, from the viewpoint of easy manufacture of a mold for the optical path difference providing structure and from the viewpoint of excellent transfer of the mold. Therefore, it is more preferable that the all step differences in the first optical path difference providing structure do not have the step difference amount satisfying other than dC and dD.

When designing an optical element according to the present embodiment, it can be considered to use the following method for its design. First, a basic structure which is an optical path difference providing structure comprising a ring-shaped structure, is designed. Next, another basic structure is designed and the another basic structure comprises a ring-shaped structure which emits different order diffracted light flux with the maximum light amount for some wavelength from the diffracted light flux with the maximum light amount emitted from the former basic structure. Then, these two basic structures (they may be three basic structures) are overlapped together to design the first optical path difference providing structure or the second optical path difference providing structure.

When designing the optical path difference providing structure using this method, there is a possibility that a ring-shaped zone with small pitch width appears. For example, the optical path difference providing structure shown in FIG. 8c can be obtained by overlapping the basic structure shown in FIG. 8a and the basic structure shown in FIG. 8b. However, there appears a small ring-shaped zone with a small pitch width which is shown as Wa in FIG. 8c in the obtained structure. Here, the pitch width means a width of the ring-shaped zone in the direction perpendicular to the optical axis of the optical element. For example, when the optical path difference providing structure is a structure shown in FIG. 7, the pitch width represents each length of w1, w2, w3, and w4.

The inventors of the present invention have found, as a result of earnest study, that when the ring-shaped zone has width Wa of 5 μm or less, the ring-shaped zone can be removed or filled without greatly affecting the optical characteristics. Namely, in the structure shown in FIG. 8c, the optical characteristics is not substantially affected, even when the small pitch width in which Wa is 5 μm or less is removed.

Further, it is preferable that the pitch width of the step difference is not excessively small, from the viewpoint of manufacturing a mold easily and keeping transferability of the mold in a good condition. Therefore, when a ring-shaped zone with the pitch width of 5 μm or less appears in the primitive optical path difference providing structure designed by overlapping plural basic structures, it is preferable that the ring-shaped zone with the pitch width of 5 μm or less is removed to obtain the final version of the optical path difference providing structure. When the ring-shaped zone with the pitch width of 5 μm or less is the protruded shape, the ring-shaped zone can be cut out to be removed. When the ring-shaped zone with the pitch width of 5 μm or less is the depressed shape, the ring-shaped zone can be filled up to be removed.

Accordingly, at least the first optical path difference providing structure are preferably composed of the ring-shaped zones whole of which have pitch width of 5 μm or more.

From a viewpoint that fewer thin ring-shaped zones are preferable, it is preferable that the entire of the ring shaped zones of the first optical path difference providing structure satisfies that the value of ("step difference amount"/"pitch width") is preferably 1 or less, and more preferably is 0.8 or less. Further more preferably, the entire of the ring shaped zones of all of the optical path difference providing structures satisfy that the value of ("step difference amount"/"pitch width") is preferably 1 or less, and most preferably is 0.8 or less.

Further, the third light flux passing through the first optical path difference providing structure of the objective lens, forms a first best focus at which the third light flux forms a spot having the smallest diameter, and a second best focus at which the third light flux forms a spot having the second smallest diameter. Hereupon, the best focus used herein means a position where the beam waist is minimized within the predetermined defocus range. That is, the case that the third light flux forms the first best focus and the second best focus means that there are at least two positions where the beam waist is locally minimized within the predetermined defocus range in the third light flux. Hereupon, the first best focus is preferably formed by a diffracted light flux with a maximum light amount in the third light flux passing through the first optical path difference providing structure. The second best focus is preferably formed by a diffracted light flux with a second maximum light amount in the third light flux passing through the first optical path difference providing structure. When the difference between the diffraction efficiency of the diffracted light flux which forms the first best focus and the diffraction efficiency of the diffracted light flux which forms the second best focus, is 20% or less, the effect of the present embodiment becomes more conspicuous.

Hereupon, it is preferable that the spot formed by the third light flux at the first best focus is used for recording and/or reproducing information for the third optical disc, and that the spot formed by the third light flux at the second best focus is not used for recording and/or reproducing information for the third optical disc. However, it does not denies an embodiment that the spot formed by the third light flux in the first best focus is not used for recording and/or reproducing information for the third optical disc, and that the spot formed by the third light flux in the second best focus is used for recording and/or reproducing information for the third optical disc. Hereupon, when the first optical path difference providing structure is provided on the surface on the light source side of the objective lens, the second best focus is preferably nearer to the objective optical element, than the first best focus.

Further, the first best focus and the second best focus satisfy the following expression (15).

$$0.05 \leq L/f13 \leq 0.35 \tag{15}$$

Where, f13 (mm) indicates the focal length of the objective optical element for the third light flux when the third light flux passing through the first optical path difference providing structure forms the first best focus, and L (mm) indicates the distance between the first best focus and the second best focus.

Further, it is more preferable to satisfy the following expression (15)'.

$$0.10 \leq L/f13 \leq 0.25 \tag{15'}$$

It is furthermore preferable to satisfy the following expression (15)".

$$0.11 \leq L/f13 \leq 0.24 \tag{15"}$$

Further, it is preferable that L is 0.18 mm or more, and is 0.63 mm or less. Furthermore, it is preferable that f13 is 1.8 mm or more, and is 3.0 mm or less.

According to the above structure, it allows to prevent the unused light which is a light not used for recording and/or reproducing information for the third optical disc, from affecting the light receiving element for the tracking operation, and enables to maintain the excellent tracking characteristics when information is recorded and/or reproduced for the third optical disc.

Next, one preferable embodiment (Embodiment 2-1) in the second embodiment group of the first optical path difference providing structure will be described below.
(Embodiment 2-1)

The present embodiment is an embodiment that the first optical path difference providing structure is composed of only a single basic structure. In the present embodiment, the single basic structure is a step-type structure. More preferable conditions of the present embodiment will be described below.

The basic structure being a step-type structure (which is also the first optical path difference providing structure) emits a Xth-order diffracted light flux with a larger light amount than diffracted light fluxes with any other diffraction orders, when the first light flux passes through the basic structure, emits a Yth-order diffracted light flux with a larger light amount than diffracted light fluxes with any other diffraction orders, when the second light flux passes through the first basic structure, and emits a Zth-order diffracted light flux with a larger light amount than diffracted light fluxes with any other diffraction orders, when the third light flux passes through the first basic structure. In this case, it is preferable that each of the values of X, Y and Z is not zero. Further, it is preferable that any one of X, Y and Z is a diffraction order of positive value and others are diffraction orders of negative values.

As preferable examples of combinations of X, Y and Z, there are cited (1, −1, −2), (1, −2, −3) and (1, −3, −4). Especially, there are cited (1, −1, −2) and (1, −2, −3) as preferable examples.

It is possible to provide an objective lens which realizes compatibility of three types of optical discs of three types of BDs, DVDs and CDs, and further possible to provide an objective lens with well-balanced light utilizing efficiency so as to maintain high light utilizing efficiency especially for BDs. For example, it is possible to provide an objective lens wherein a diffraction efficiency for wavelength $\lambda 1$ is 80% or more. Further, it is possible to provide an objective lens wherein a diffraction efficiency for wavelength $\lambda 1$ is 90% or more, too.

From the viewpoint of a form and a step difference amount of the first optical path difference providing structure, the situations that X, Y and Z are 1, −1 and −2, respectively and that X, Y and Z are 1, −2 and −3, respectively, can be represented as the followings.

Under the situation that X, Y and Z are 1, −1 and −2, respectively, it is preferable that it is a five-level step-type structure as shown in FIG. 9a. Further, it is preferable that the step difference amount B2 in the optical axis direction of a smaller step difference of the step-type structure provides an optical path difference of 1.23 $\lambda 1$ for the first wavelength $\lambda 1$.

The step difference amount B2 in the optical axis direction of a smaller step difference of the step-type structure preferably satisfies the following conditional expression.

$$0.9 \cdot (1.23\lambda 1/(n-1)) < B2 < 1.5 \cdot (1.23\lambda 1/(n-1)) \tag{16}$$

Under the situation that X, Y and Z are 1, −2 and −3, respectively, it is preferable that it is a seven-level step-type structure as shown in FIG. 9b. Further, it is preferable that the step difference amount B2 in the optical axis direction of a smaller step difference of the step-type structure provides an optical path difference of 1.16 $\lambda 1$ for the first wavelength $\lambda 1$.

The step difference amount B2 in the optical axis direction of a smaller step difference of the step-type structure preferably satisfies the following conditional expression.

$$0.9 \cdot (1.16\lambda 1/(n-1)) < B2 < 1.5 \cdot (1.16\lambda 1/(n-1)) \tag{17}$$

Second Optical Path Difference Providing Structure:

Next, as for the second optical path difference providing structure provided on the intermediate area, the second optical path difference providing structures suitable for the three embodiment: (Embodiment 1-1), (Embodiment 1-2) and (Embodiment 1-3) provided in the descriptions of the first optical path difference providing structure will be explained, respectively.
(Embodiment 1-1)

In the present embodiment, there will be described below preferable conditions of the second optical path difference providing structure under the situation that the first optical path difference providing structure described above (Embodiment 1-1) is a structure formed by overlapping at least a first basic structure being a blaze-type structure and a second basic structure being a blaze-type structure together.

The second optical path difference providing structure is a structure wherein at least three basic structure of a third basic structure, fourth basic structure and fifth basic structure are overlapped together.

The third basic structure emits an Ath-order diffracted light flux with a larger light amount than diffracted light fluxes with any other diffraction orders, when the first light flux passes through the third basic structure, emits a Bth-order diffracted light flux with a larger light amount than diffracted light fluxes with any other diffraction orders, when the second light flux passes through the third basic structure, and emits a Cth-order diffracted light flux with a larger light amount than diffracted light fluxes with any other diffraction orders, when the third light flux passes through the third basic structure. The fourth basic structure emits a Dth-order diffracted light flux with a larger light amount than diffracted light fluxes with any other diffraction orders, when the first light flux passes through the fourth basic structure, emits a Eth-order diffracted light flux with a larger light amount than diffracted light fluxes with any other diffraction orders, when the second light flux passes through the fourth basic structure, and emits a Fth-order diffracted light flux with a larger light amount than diffracted light fluxes with any other diffraction orders, when the third light flux passes through the fourth basic structure. In this case, each of A, B, C, D, E and F is an integer.

The first optical path difference providing structure and the second optical path difference providing structure preferably satisfy the following expressions (18), (19), (20) and (21). Owing to this, a phase difference generated in the optical path difference providing structures in the central area and a phase difference generated in the optical path difference providing structure in the intermediate area can be made to be almost equal, and a phase shift between the central area and the intermediate area can be reduced accordingly, which is preferable.

$$X = A \tag{18}$$

$$Y = B \tag{19}$$

$$L = D \tag{20}$$

$$M = E \tag{21}$$

It is more preferable that Z=C and N=F are also satisfied. In other words, it is preferable that the first basic structure is the same as the third basic structure in terms of a structure and the second basic structure is the same as the fourth basic structure in terms of a structure.

It is preferable that the fifth basic structure emits a 0th-order diffracted light flux with a larger light amount than diffracted light fluxes with any other diffraction orders, when the first light flux passes through the fifth basic structure, emits a 0th-order diffracted light flux with a larger light amount than diffracted light fluxes with any other diffraction orders, when the second light flux passes through the fifth basic structure, and emits a Gth-order diffracted light flux with a larger light amount than diffracted light fluxes with any other diffraction orders, when the third light flux passes through the fifth basic structure. In this case, G is an integer excluding 0. By overlapping such the fifth basic structure with the other basic structure, it is possible to form flare light on an information recording surface of the third optical disc with respect to only the third light flux, without having an influence on the first light flux and the second light flux each passing the intermediate area and generating a phase shift at the boundary of the central area and the intermediate area. Thereby, an influence of the unwanted light on the converged spot can be reduced.

It is preferable that G is ±1. When G is ±1, it is preferable that the fifth basic structure is a two-level step-type structure (which is also called a binary structure) as shown in FIG. 3d.

When the fifth basic structure is a two-level step-type structure, it is preferable that step difference amount LB1 measured along its optical axis is the step difference amount that provides an optical path difference equivalent to 5 times the first wavelength $\lambda 1$ for the first light flux, or the step difference amount that provides an optical path difference equivalent to 3 times the first wavelength $\lambda 1$ for the first light flux. When the two-level staircase structure provides an optical path difference equivalent to 5 times the first wavelength $\lambda 1$ for the first light flux, an influence of an unwanted light caused when information is recorded and/or reproduced for CD can be reduced substantially, which is preferable. On the other hand, by forming the two-level staircase structure into a structure to provide an optical path difference equivalent to 3 times the first wavelength $\lambda 1$ for the first light flux, it is possible to lower a height of the fifth basic structure, thus, it is easy to manufacture, and manufacturing loss can be reduced, which is preferable from a viewpoint to prevent a decline of a light utilizing efficiency. It is also preferable from the viewpoint of controlling fluctuations of diffraction efficiency under the wavelength change to be small.

Namely, it is preferable that the step difference amount LB1 of the fifth basic structure satisfies the following conditional expressions (22) and (23).

$$0.9 \cdot (5 \cdot \lambda 1/(n-1)) < LB1 < 1.5 \cdot (5 \cdot \lambda 1/(n-1)) \quad (22)$$

$$0.9 \cdot (3 \cdot \lambda 1/(n-1)) < LB1 < 1.5 \cdot (3 \cdot \lambda 1/(n-1)) \quad (23)$$

Further, when $\lambda 1$ is 390-415 nm (0.390-0.415 µm) and n is 1.54-1.60, the expressions above can be expressed as follows.

$$2.92 \, \mu m < LB1 < 5.77 \, \mu m \quad (24)$$

$$1.75 \, \mu m < LB1 < 3.46 \, \mu m \quad (25)$$

Therefore, a preferable second optical path difference providing structure becomes a structure wherein a binary structure satisfying G=±1 is overlapped with a structure that is equivalent to the aforesaid preferable first optical path difference providing structure.

Further, the second optical path difference providing structure preferably comprises step differences on upper terrace surface Pc of a two-level step-type structure shown in intermediate area MD in FIG. 25 (a sectional view of Example TH09). What is further preferable is that plural steps are provided. It is preferable that these steps are derived from plural third basic structures and a single fourth basic structure.

By providing plural step differences of the third basic structure on the upper terrace surface of the two-level step-type structure, it becomes easy for resin to run up to an end portion of a mold of the two-level step-type structure. Thereby, transfer characteristics are improved, a loss in manufacturing can be decreased and a decline of light utilization efficiency can be prevented. In addition, it becomes possible to locate a converging position of unwanted diffracted light to be farther from a converging position of necessary diffracted light. Thereby, a detection error caused by unwanted diffracted light converged on a light-receiving element, can be avoided, which is preferable.

It is preferable that the smallest pitch of the fifth basic structure is 10 µm or more. The pitch is preferably 100 µm or less. By employing the two-level step-type structure whose step difference amount tends to be high, in the intermediate area rather than the central area, it becomes possible to broaden pitches, so that resin may easily reaches the deep portion of a mold in injection molding process, and thereby, to reduce a manufacturing loss.

(Embodiment 1-2)

In the present embodiment, there will be described below preferable conditions of the second optical path difference providing structure under the situation that the first optical path difference providing structure described above (Embodiment 1-2) is a structure formed by overlapping at least a first basic structure being a blaze-type structure and a second basic structure being a step-type structure together.

The second optical path difference providing structure of the present embodiment is a structure including at least a fifth basic structure.

The fifth basic structure is a blaze-type structure, emits an Hth-order diffracted light flux with a larger light amount than diffracted light fluxes with any other diffraction orders, when the first light flux passes through the third basic structure, emits a Ith-order diffracted light flux with a larger light amount than diffracted light fluxes with any other diffraction orders, when the second light flux passes through the third basic structure, and emits a Jth-order diffracted light flux with a larger light amount than diffracted light fluxes with any other diffraction orders, when the third light flux passes through the third basic structure. In this case, it is preferable that (H, I, J) is any one of (1, 1, 1), (2, 1, 1), (3, 2, 2).

When an objective lens is a plastic lens, it is preferable that the second optical path difference providing structure is a structure that a sixth basic structure is overlapped with the fifth basic structure, in order to reduce a change of spherical aberration due to a temperature change. The sixth basic structure is a blaze-type structure, emits an Kth-order diffracted light flux with a larger light amount than diffracted light fluxes with any other diffraction order, when the first light flux passes through the third basic structure, emits a Lth-order diffracted light flux with a larger light amount than diffracted light fluxes with any other diffraction order, when the second light flux passes through the third basic structure, and emits a Mth-order diffracted light flux with a larger light amount than diffracted light fluxes with any other diffraction order, when the third light flux passes through the third basic structure. In this case, it is preferable that (K, L, M) is any one of (10, 6, 5) and (5, 3, 3 or 2).

(Embodiment 2-1)

In the present embodiment, there will be described below preferable conditions of the second optical path difference providing structure, under the situation that the first optical path difference providing structure described above (Embodiment 2-1) is a structure composed of only one basic structure.

The second optical path difference providing structure of the present embodiment is a structure including at least a seventh basic structure.

The seventh basic structure is a step-type structure, emits an Nth-order diffracted light flux with a larger light amount than diffracted light fluxes with any other diffraction orders, when the first light flux passes through the seventh basic structure, emits a 0th-order diffracted light flux with a larger light amount than diffracted light fluxes with any other diffraction orders, when the second light flux passes through the seventh basic structure, and emits a Pth-order diffracted light flux with a larger light amount than diffracted light fluxes with any other diffraction orders, when the third light flux passes through the seventh basic structure. In this case, it is preferable that (N, O, P) is (0, −1, −1).

At that time, it is preferable that the seventh basic structure is a three-level step-type structure and the step difference amount in the optical axis direction of a smaller step difference of the step-type structure provides an optical path difference of $1.02 \lambda 1$ for the first wavelength $\lambda 1$.

Third Optical Path Difference Providing Structure:

Next, the third optical path difference providing structure formed on the peripheral area will be explained. When an objective lens is a plastic lens, the third optical path difference providing structure is preferably provided, in order to reduce a change of spherical aberration due to a temperature change. The third optical path difference providing structure is preferably composed of a single eighth basic structure being a blaze-type structure, regardless the above embodiments of the first optical path difference providing structure and the second optical path difference providing structure.

The eighth basic structure is a blaze-type structure, emits an Qth-order diffracted light flux with a larger light amount than diffracted light fluxes with any other diffraction orders, when the first light flux passes through the eighth basic structure, emits a Rth-order diffracted light flux with a larger light amount than diffracted light fluxes with any other diffraction orders, when the second light flux passes through the eighth basic structure, and emits a Sth-order diffracted light flux with a larger light amount than diffracted light fluxes with any other diffraction orders, when the third light flux passes through the eighth basic structure. In this case, Q can be an arbitrary value, but from the viewpoint to reduce a fluctuation of a diffraction efficiency when a wavelength changes, (Q, R, S) is any one of (1, 1, 1), (2, 1, 1), (3, 2, 2), and (5, 3, 2).

The first optical path difference providing structure, the second optical path difference providing structure and the third optical path difference providing structure has been described above.

Processed Form of Optical Path Difference Providing Structure:

Next, from the viewpoint of processability of an objective lens, a shape of a preferable optical path difference providing structure will be described below.

When an objective lens including an optical path difference providing structure is molded, the following processes are performed to mold a lens generally. A mold is cut into a shape of the lens including the optical path difference providing structure with a double-shaft processing machine (its example is shown in FIG. 16) with a cutting tool such as a point cutting tool (its example is shown in FIGS. 17*a* and 17*b*), and molten material is poured into the mold which has been cut. After the material is cooled and becomes solid, a lens is brought out from the mold.

As described above, from the view point of cutting a mold, it is preferable that the optical path difference providing structure includes a portion where a step difference surface is oblique, in order to reduce the interference of the point cutting tool and the mold. Herein, "oblique" means that the surface is not parallel with the optical axis. By providing a portion where a step difference surface is oblique, a mold releasing characteristics of the objective lens can be enhanced, which is preferable.

It is preferable that the step difference surface to be oblique is a step difference surface at the optical axis side. The step difference surface at the optical axis side is originally located at a position where it is easily shaded when a light flux enters. Therefore, even when the step difference surface becomes oblique, it does not affect loss of the light utilization efficiency so largely, which is preferable.

Further, because the tip of the point cutting tool does not have an acute angle but has a certain curvature. Therefore, it is preferable that the corner portions of the optical path difference providing structure have curvature.

For example, under the condition that the optical path difference providing structure is a blaze-type structure, step difference surface P which is parallel with the optical axis as shown in FIG. 15*a* makes the following problem. When a mold of the above structure is produced with a double-shaft processing machine including a point cutting tool, the point-ing cutting tool easily touch a surface parallel with the optical axis in the mold and a three-shaft processing machine which is high in a processing difficulty and is expensive is required to be used, because the mold is for use in a lens with a large curvature such that NA is as high as 0.75 or more.

To solve that, step difference surface P at the optical axis side in the blaze-type structure is made to be oblique with respect to the optical axis as shown in FIG. 15*b*, which solves the problem that the point cutting tool touches the mold and is very advantageous in the viewpoint of processing of the mold. Further, because the oblique surface is the step difference surface at the optical axis side, loss of the light utilization efficiency results in a small quantity. In this case, it is preferable that an angle formed by the oblique surface and the optical axis (represented by $\theta$ in FIG. 15*b*) is 10 degrees or more and is less than 20 degrees.

As shown in FIG. 15*b*, corner portion CN of the blaze-type structure has curvature.

As another example, as shown in FIG. 18, there is cited an example that both of the step difference surface at the optical axis side and the step difference surface opposite to the optical axis in a step-type structure (which is a four-level structure in this case) are oblique. In this case, the mold can be processed with point cutting tool BB being vertically kept rather than being inclined. At that time, it is preferable that an angle formed by each oblique surface and the optical axis is 10 degrees or more and is less than 20 degrees.

Alternatively, as shown in FIG. 19, there is cited an example that the step difference surface at the optical axis side is oblique and the step difference surface opposite to the optical axis is formed to be parallel or almost parallel with the optical axis, in a step-type structure (which is a four-level structure in this case). In this case, the step difference surface opposite to the optical axis can be cut to be parallel or almost parallel with the optical axis without the point cutting tool touching the mold, by inclining point cutting tool BB. Due to the inclination, the step difference surface at the optical axis side becomes greatly oblique. In this case, it is preferable that an angle formed by the step difference surface at the optical axis side and the optical axis is 15 degrees or more and is 35 degrees or less. It is preferable that the angle formed by the step difference surface opposite to the optical axis and the optical axis is 0 degree or more and is 15 degrees or less. It is more preferable that the angle is 1 degree or more and is 15 degrees or less for enhancing a mold-release characteristic of the structure from a mold. The corner portions preferably have curvature.

As another example, as shown in FIG. 20, there is cited an example that both of the step difference surface at the optical axis side and the step difference surface opposite to the optical axis in a step-type structure (which is a two-level structure in this case) are oblique. In this case, the mold can be processed with point cutting tool BB being vertically kept rather than being inclined. In this case, it is preferable that an angle formed by each oblique step difference surface and the optical axis is 10 degrees or more and is less than 20 degrees. The corner portions preferably have curvature.

As another example, as shown in FIG. 21, there is cited an example that the step difference surface at the optical axis side is oblique and the step difference surface opposite to the optical axis is formed to be parallel or almost parallel with the optical axis, in a step-type structure (which is a two-level structure in this case). In this case, the step difference surface opposite to the optical axis can be cut to be parallel or almost parallel with the optical axis without the point cutting tool touching the mold, by inclining point cutting tool BB. Due to the inclination, the step difference surface at the optical axis side is made to be greatly oblique. At that time, it is preferable that an angle formed by each step difference surface at the optical axis side and the optical axis is 15 degrees or more and is 35 degrees or less. It is preferable that the angle formed by each step difference surface opposite to the optical axis and the optical axis is 0 degree or more and is 15 degrees or less. It is more preferable that the angle is 1 degree or more and is 15 degrees or less, for enhancing a mold-release characteristic of the structure from a mold. The corner portions preferably have curvature.

Numerical Aperture:

Next, a numerical aperture of the objective lens will be described.

A numerical aperture of the objective lens on the image side that is needed for reproducing and/or recording of information for the first optical disc is represented by NA1, a numerical aperture of the objective lens on the image side that is needed for reproducing and/or recording of information for the second optical disc is represented by NA2 (NA1>NA2) and a numerical aperture of the objective lens on the image side that is needed for reproducing and/or recording of information for the third optical disc is represented by NA3 (NA2>NA3). NA1 is preferably 0.75 or more and is 0.9 or less, and it is 0.8 or more and is 0.9 or less more preferably. It is especially preferable that NA1 is 0.85. NA2 is preferably 0.55 or more and is 0.7 or less. It is especially preferable that NA2 is 0.60 or 0.65. Further, NA3 is preferably 0.4 or more and is 0.55 or less. It is especially preferable that NA3 is 0.45 or 0.53.

It is preferable that the boundary between the central area and the intermediate area of the objective lens is formed on a portion that corresponds to a range from 0.9·NA3 or more to 1.2·NA3 or less (more preferably, 0.95·NA3 or more to 1.15·NA3 or less) in the case of using the third light flux. More preferably, the boundary between the central area and the intermediate area is formed in a portion corresponding to NA3. It is further preferable that the boundary between the intermediate area and the peripheral area is formed in a portion corresponding to a range from 0.9·NA2 or more to 1.2·NA2 or less (more preferably, 0.95·NA2 or more to 1.15·NA2 or less) in the case of using the second light flux. More preferably, the boundary between the intermediate area and the peripheral area of the objective lens is formed on a portion corresponding to NA2.

When the third light flux that has passed through the objective lens is converged on an information recording surface of the third optical disc, it is preferable that spherical aberration has at least one discontinuous portion. In that case, it is preferable that the discontinuous potion is in existent in a range from 0.9·NA3 or more to 1.2·NA3 or less (more preferably, 0.95·NA3 or more to 1.15·NA3 or less) in the case of using the third light flux.

External Appearance of the Objective Lens:

Next, the total shape of the objective lens will be described below.

The objective lens has the first optical surface and the second optical surface which face each other. The first optical surface is the optical surface at the light source side, and the second optical surface is the optical surface at the optical disc side. The curvature radius of the first optical surface is preferably smaller than the second optical surface.

A diameter of an optical surface is represented as an overall diameter in the present specification. For example, in FIG. 10, the overall diameter of the first optical surface is represented as $\Phi A1$, and the overall diameter of the second optical surface is represented as $\Phi A2$.

A diameter of a portion where a light flux passes on an optical surface is represented as a diameter of an effective aperture. For example, in FIG. 10, the diameter of the effective aperture of first optical surface S1 (which is the diameter of the peripheral area) is represented as $\Phi E1$ and the diameter of the effective aperture of second optical surface S2 (which is an area on the second optical surface, corresponds to the diameter of the peripheral area on the first optical surface) is represented as $\Phi E2$.

Herein, the ratio of the diameter of the effective aperture to the overall diameter in the first optical surface is 90% or more and is 100% or less (preferably is 95% or more and is less than 100%, and more preferably is 96% or more and is 99% or less). The ratio of the diameter of the effective aperture to the overall diameter in the second optical surface is 75% or more and is 100% or less (preferably is 80% or more and is less than 100%, and more preferably is 91% or more and is 95% or less). By employing such the ranges, a light flux can enter within the effective aperture, even under the condition that the objective lens is slightly decentered toward the direction perpendicular to the optical axis when an objective lens is attached to a bobbin.

The objective lens satisfies the following conditional expression (2).

$$0.9 \leq dmax/f \leq 1.5 \quad (2)$$

In the expression, dmax (mm) represents a thickness on the optical axis of the objective lens as shown in FIG. 10, and f (mm) represents a focal length of the objective lens for the first light flux.

When handling an optical disc using a short wavelength and having a high NA as a BD, a problem that astigmatism is easily generated and also decentration coma is easily generated is caused in the objective lens. However, by satisfying the conditional expression (2), the objective lens can control the astigmatism and decentration coma.

Further, by satisfying the conditional expression (2), the objective lens becomes a thick objective lens which has a relatively thick axial thickness, which often causes the shortened working distance at information recording/reproducing for a CD. However, by arranging the first optical path difference providing structure on the objective lens, the working distance at information recording/reproducing for a CD can be maintained sufficiently, which makes its effect significant.

Further, it is preferable that the working distance (WD) of the objective optical element when the third optical disc is used, is 0.15 mm or more, and is 1.5 mm or less. The working distance of the objective optical element when the third optical disc is used, is preferably 0.3 mm or more, and 0.9 mm or less. Next, it is preferable that the WD of the objective optical element when the second optical disc is used, is 0.2 mm or more, and is 1.3 mm or less. It is preferable that WD of the objective optical element when the first optical disc is used, is 0.25 mm or more, and is 1.0 mm or less.

The objective lens satisfies the following conditional expression (1).

$$2 \leq dmax/dmin \leq 8 \quad (1)$$

In the conditional expression, dmax (mm) represents an axial thickness of the objective lens as shown in FIG. 10, for example, and dmin (mm) represents a thickness of the objective lens at a position where the objective lens is thinnest in a direction of an optical axis thereof; as shown in FIG. 10, for example.

In the example shown in FIG. 10, the objective lens includes first optical surface S1 and second optical surface S2, and further includes flange FL for attaching the objective lens to a bobbin of an optical pickup device, arranged around the optical surfaces. There is the thinnest part dmin in the flange portion, measured in the optical axis direction.

Preferably, the following conditional expression (1') is satisfied.

$$3 \leq dmax/dmin \leq 8 \quad (1')$$

Lens Ejection (Pin Ejection, Core Ejection):

When the objective lens is a plastic lens, the objective lens is required to be brought out from a mold after a resin molding process with a molding machine. In a molding machine, generally, a first mold for molding the first optical surface and a second mold for molding the second optical surface are installed. The mold includes a holding section and a core insert section arranged inside the holding section. There may be provided a structure that the core insert section is slidable in the optical axis direction, and may be provided a structure that the core insert section is fixed to the holding section. When the molding machine works, the first mold and the second mold face to each other and are in contact with each other tightly, to form a cavity of a lens. After resin is poured into the cavity and is molded, the first mold and the second mold are opened and an objective lens is brought out from the mold where the objective lens is left.

When bringing the objective lens out from the mold, it can be considered to use a method to push the overall optical surface of the objective lens and bring out the objective lens by sliding the core insert section of the mold installed on the molding machine (also referred as a core ejection), and a method that the mold installed in the molding machine includes thin pins and the flange of the objective lens is pushed with the pins to bring out the objective lens (also referred as a pin ejection).

When the flange of the objective lens is pushed and the objective lens is brought out, as shown in FIG. 11b which illustrates the objective lens viewed from the side of first optical surface S1, plural prints of pins appear on flange FL. On the other hand, when the overall optical surface of the objective lens is pushed and the objective lens is brought out, as shown in FIG. 11a, no prints of pins appear on flange FL. Depending on a molding method, prints of pints can appear on the surface facing second optical surface S2 of the flange.

Gate Cut:

When the objective lens is a plastic lens, a gate which is a filling opening for resin is required to be removed after a lens is molded. Some embodiments of the gate will be described below.

In FIG. 12a, flange FL of the objective lens includes linear portion LP around gate GT and the gate is cut off along line L which is parallel with the linear portion LP. The objective lens after the gate is removed has a shape as shown in FIG. 12b and the remains of the gate and burrs positions within a virtual circle formed by an extended line of the outer circumference of the flange.

In FIG. 13a, flange FL of the objective lens has a round shape, but the gate is cut off together with the flange along line L around gate GT. In the objective lens after the gate has been removed, the flange has a shape including linear portion LP.

In FIGS. 14a and 14b, the gate is removed in the way that the flange is partially removed along the optical axis direction. Therefore, in the objective lens after the gate has been removed, the flange section has a shape including both of portion FC1 where the full circumference of the flange section forms a circle, and portion FC2 where a part of the circumference becomes a linear shape.

In order to enhance the transferability of resin, there can be used a method that an air hole (also referred as an air vent) is formed on the mold to inhale the air or discharge the air inside the mold through the air hole. In this case, it is possible that resin comes into the air bent and forms burrs. At that time, it is preferable that the air-vent burrs are removed.

Coating:

For using laser light emitted by a light source efficiently, ways and means to enhance the transmittance has been given to the objective lens. For example, an antireflection film is formed on an optical surface of the objective lens, to control the amount of light reflected on the optical surface by using an interference of light.

When an antireflection film is formed on the objective lens, it is required that antireflection is realized for respective light fluxes with various wavelengths entering there. Though the increased thickness of the antireflection film must be allowed in order to broaden the wavelength range in which the antireflection is realized, the increased film thickness changes the shape of the optical path difference providing structure (especially the shape of the corner section) into a round shape, which can causes a possibility that a desired optical performance is not obtained.

When trying to obtain an optical performance coming from an optical path difference providing structure within the short wavelength range being 450 nm or less, as the present invention, the optical path difference providing structure becomes a minute structure, which causes a problem that the antireflection film affect the shape of a diffractive structure further more greatly.

Further, a so-called wiping characteristic is required for an optical component on which an antireflection is formed, where the wiping characteristic is a characteristic which controls a separation of an antireflection film coming from wiping extraneous materials which have stuck on an optical surface. When a thick antireflection film is formed on an optical path difference providing structure, there is caused a problem that the wiping characteristic is significantly deteriorated.

To enable, for example, a minute optical path difference providing structure to exhibit its original optical properties while the wiping characteristic is maintained and the optical transmittance is kept to be high, the following antireflection film is preferably provided.

For example, there is cited a preferable example that the number of layers of the antireflection film on the optical surface where an optical path difference providing structure is arranged is reduced to be smaller than the number of layers of the antireflection film on the optical surface where an optical path difference providing structure is not arranged. This structure can reduce the thickness of the antireflection film on the optical surface where an optical path difference providing structure is arranged, which makes the shape of the minute optical path difference providing structure on which the film is formed maintained easily. Therefore, the deterioration of the optical properties of the minute optical path difference providing structure can be avoided. Further, the structure can enhance the wiping characteristic. On the other hand, even when the number of layers of the antireflection film is increased on the optical surface where an optical path difference providing structure is not arranged, the increase of the layer number does not cause a significant deterioration of the optical properties and does not deteriorates the wiping characteristic. Therefore, the number of layers of the antireflection film is increased to exhibit a sufficient antireflection function.

The antireflection film on the optical surface where optical path difference providing structure is not arranged is preferably formed of seven to ten layers.

On the other hand, the antireflection film on the optical surface where optical path difference providing structure is arranged preferably has the smaller number of layers than the number of layers of the antireflection film on the optical surface where optical path difference providing structure is not arranged, and is preferably formed of any one of one to nine layers. More preferably, the number of layers is any one of one to three layers.

Alternatively, there can be provided a structure that an antireflection film is not formed on the optical surface where optical path difference providing structure is arranged and an antireflection film is formed on only the optical surface where optical path difference providing structure is not arranged.

It is preferable that high-refractive-index layers (referred as material H) and low-refractive-index layers (referred as material L) are arranged one after the other in the antireflection film, that intermediate-refractive-index layers (referred as material M) and low-refractive-index layers are arranged one after the other in the antireflection film, or that high-refractive-index layers, intermediate-refractive-index layers and low-refractive-index layers (referred as material L) are arranged one after the others in the antireflection film. The low-refractive-index layer preferably represents a layer whose refractive index at the design wavelength (which is 480 nm or more and is 540 nm or less preferably) is 1.30 or more and is 1.50 or less. The intermediate-refractive-index layer preferably represents a layer whose refractive index at the design wavelength is 1.55 or more and is 1.70 or less. The high-refractive-index layer preferably represents a layer whose refractive index at the design wavelength is 1.75 or more and is 2.50 or less.

As preferable examples of the low-refractive-index layers, there can be cited aluminum fluoride, magnesium fluoride, and silicon oxide. As preferable examples of the intermediate-refractive-index layers, there can be cited aluminum oxide, yttrium oxide, and cerium fluoride. As preferable examples of the high-refractive-index layers, there can be cited zirconium oxide, tantalum oxide, titanium oxide, and hafnium oxide. As a coating method, there can be cited a vacuum deposition method, sputtering method, a CVD method, an atmospheric pressure plasma method, an application method and a mist method. When the objective lens is a glass lens, it is preferable that an annealing process is performed after an antireflection film is formed.

Table 1 shows several preferable combinations of the high-refractive-index layers, intermediate-refractive-index layers and low-refractive-index layers.

TABLE 1

|  | Example 1 Single-layer structure | Example 2 Two-layer structure | Example 3 Two-layer structure | Example 4 Three-layer structure | Example 5 Three-layer structure |
|---|---|---|---|---|---|
| 10th layer |  |  |  |  |  |
| 9th layer |  |  |  |  |  |
| 8th layer |  |  |  |  |  |
| 7th layer |  |  |  |  |  |
| 6th layer |  |  |  |  |  |
| 5th layer |  |  |  |  |  |
| 4th layer |  |  |  |  |  |
| 3rd layer |  |  |  | Material L | Material L |
| 2nd layer |  | Material L | Material L | Material H | Material H |
| 1st layer | Material L | Material H | Material M | Material M | Material L |
| Base material | Plastic or glass | Plastic or glass | Plastic or glass | Plastic or glass | Plastic or glass |

|  | Example 6 Four-layer structure | Example 7 Four-layer structure | Example 8 Five-layer structure | Example 9 Five-layer structure | Example 10 Six-layer structure |
|---|---|---|---|---|---|
| 10th layer |  |  |  |  |  |
| 9th layer |  |  |  |  |  |
| 8th layer |  |  |  |  |  |
| 7th layer |  |  |  |  |  |
| 6th layer |  |  |  |  | Material L |
| 5th layer |  |  | Material L | Material L | Material H |
| 4th layer | Material L | Material L | Material H | Material H | Material M |
| 3rd layer | Material H | Material H | Material L | Material M | Material L |
| 2nd layer | Material H | Material L | Material H | Material L | Material M |
| 1st layer | Material L | Material L | Material L | Material M | Material L |
| Base material | Plastic or glass | Plastic or glass | Plastic or glass | Plastic or glass | Plastic or glass |

TABLE 1-continued

|  | Example 11<br>Seven-layer<br>structure | Example 12<br>Eight-layer<br>structure | Example 13<br>Nine-layer<br>structure | Example 14<br>Ten-layer<br>structure |
| --- | --- | --- | --- | --- |
| 10th layer |  |  |  | Material L |
| 9th layer |  |  | Material L | Material H |
| 8th layer |  | Material L | Material H | Material L |
| 7th layer | Material L | Material H | Material L | Material H |
| 6th layer | Material H | Material L | Material H | Material L |
| 5th layer | Material L | Material H | Material L | Material H |
| 4th layer | Material H | Material L | Material H | Material L |
| 3rd layer | Material L | Material H | Material L | Material H |
| 2nd layer | Material H | Material L | Material H | Material L |
| 1st layer | Material L | Material H | Material L | Material H |
| Base material | Plastic or glass | Plastic or glass | Plastic or glass | Plastic or glass |

Magnification:

Each of the first light flux, second light flux and third light flux may enter the objective lens as a parallel light flux, a divergent light flux or a convergent light flux. For avoiding generation of coma in a tracking operation, it is preferable that all the first light flux, second light flux and third light flux enter the objective lens as parallel light fluxes or almost parallel light fluxes. When the first light flux becomes a parallel light flux or an almost parallel light flux, image-forming magnification m1 of the objective lens when the first light flux enters the objective lens preferably satisfies the following expression (26).

$$-0.01 < m1 < 0.01 \quad (26)$$

When the second light flux becomes a parallel light flux or an almost parallel light flux, image-forming magnification m2 of the objective lens when the second light flux enters the objective lens preferably satisfy the following expression (27).

$$-0.01 < m2 < 0.01 \quad (27)$$

On the other hand, when the second light flux enters the objective lens as a divergent light flux, image-forming magnification m2 of the objective lens when the second light flux enters the objective lens preferably satisfies the following expression (27)'.

$$-0.025 < m2 < -0.01 \quad (27)'$$

When the third light flux becomes a parallel light flux or an almost parallel light flux, image-forming magnification m3 of the objective lens when the third light flux enters the objective lens preferably satisfies the following expression (28).

$$-0.01 < m3 < 0.01 \quad (28)$$

On the other hand, when the third light flux enters the objective lens as a divergent light flux, image-forming magnification m3 of the objective lens when the third light flux enters the objective lens preferably satisfies the following expression (28)'.

$$-0.025 < m3 < -0.01 \quad (28)'$$

An optical information recording and reproducing device relating to the present invention includes an optical disc drive device including the above optical pickup device.

Herein, the optical disc drive apparatus installed in the optical information recording and reproducing device will be described. There is provided an optical disc drive apparatus employing a system of taking out only a tray which can hold an optical disc under the condition that the optical disc is mounted thereon, outside from the main body of the optical information recording and reproducing device in which optical pickup device is housed; and a system of taking out the main body of the optical disc chive apparatus in which the optical pickup device is housed.

The optical information recording and reproducing device using each of the above described systems, is generally provided with the following component members but the members are not limited to them: an optical pickup device housed in a housing; a drive source of the optical pickup device such as seek-motor by which the optical pickup device is moved toward the inner periphery or outer periphery of the optical disc for each housing; traveling means having a guide rail for guiding the optical pickup device toward the inner periphery or outer periphery of the optical disc; and a spindle motor for rotation driving of the optical disc.

The optical information recording and reproducing device employing the former system is provide with, other than these component members, a tray which can hold the optical disc with the optical disc being mounted thereon, and a loading mechanism for slidably moving the tray. The optical information recording and reproducing device employing the latter system does not include the tray and loading mechanism, and it is preferable that each component member is provided in the drawer corresponding to chassis which can be taken out outside.

ADVANTAGEOUS EFFECT OF INVENTION

When the objective lens is configured to handle an optical disc with high NA using a short wavelength such as a BD, there is caused a problem that astigmatism is easily generated and decentration coma is easily generated. However, when the conditional expression (2) is satisfied, generation of astigmatism and decentration coma can be controlled. When the objective lens which can handle three types of optical discs satisfies the conditional expression (2), both of securing the axial thickness suitable for handling such the BD and securing a working distance suitable for handling a CD which has a thick protective substrate can be achieved. Further, when the objective lens satisfies the conditional expression (1), the flange of the objective lens is prevented from being excessively thin while the conditional expression (2) is satisfied, which results in a stable production of the objective lenses and providing objective lenses which is hardly broken. Further, when the ratio of the diameter of the effective aperture on each optical surface is set to be within the above-described range, the following matters are allowed. Stable optical surfaces with less production errors within the effective apertures can be obtained, while the flange of the objective lens is prevented from being thin. Further, there is provided an increased permissible amount of installation error to an optical pickup device, where the installation error is generated in the direction perpendicular to the optical axis when the objective lens is installed in an optical pickup device, which resulting in an increase of installation easiness of the objective lens to the optical pickup device.

Each of FIGS. 3a, 3b, 3c and 3d is a sectional view along the axis line, showing an optical path difference providing structure.

Figures 4A, 4B:
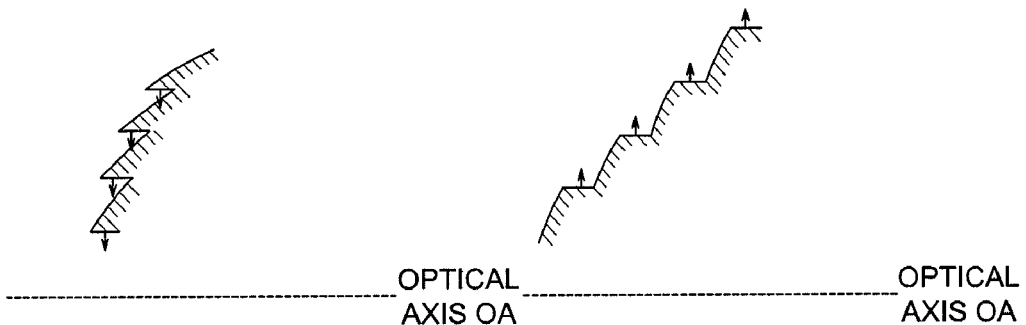

FIG. 4a is a diagram illustrating a condition that step difference surfaces face the optical axis direction and FIG. 4b is a diagram illustrating a condition that step difference surfaces face the direction opposite to the optical axis.

Figures 5A, 5B:
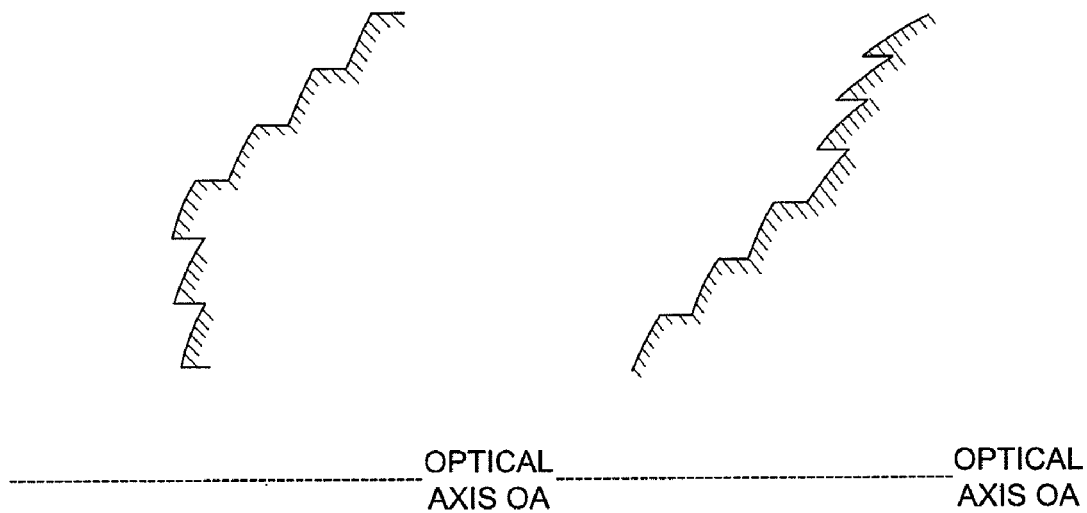

FIG. 5a shows a shape that step difference surfaces face the optical axis direction around the optical axis, then the direction switches at a point on the way toward the periphery and step difference surfaces face the direction opposite to the optical axis around the intermediate area, and FIG. 5b is a shape that step difference surfaces face the direction opposite to optical axis around the optical axis, then the direction switches at a point on the way toward the periphery and step difference surfaces face the optical axis direction around the intermediate area.

Figure 6:
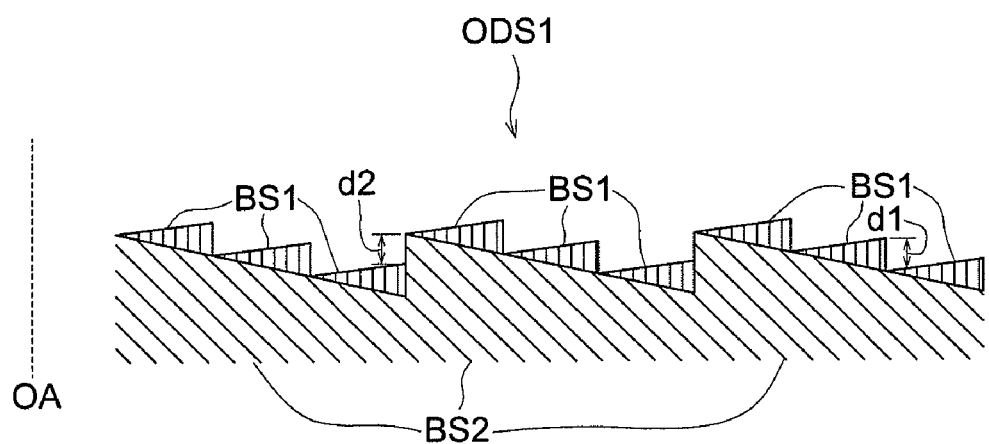

FIG. 6 is a schematic diagram of an example of a first optical path difference providing structure.

Figure 7:
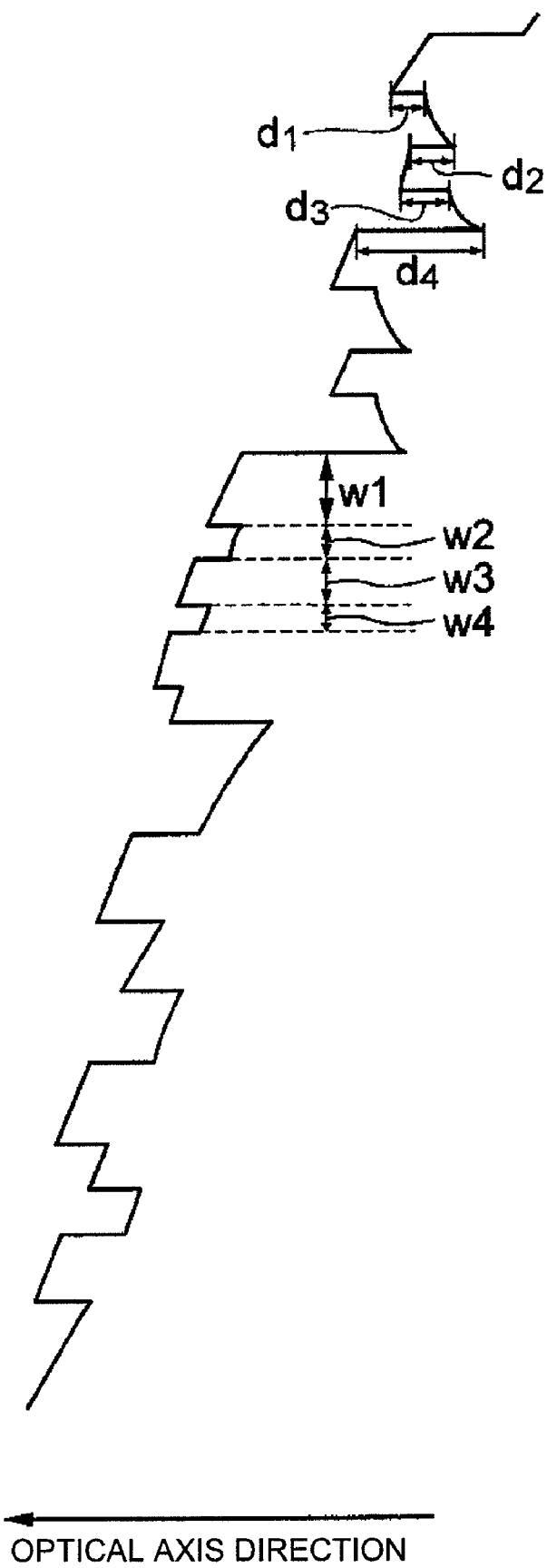
Figure 8A:
Figure 8B:
Figure 8C:
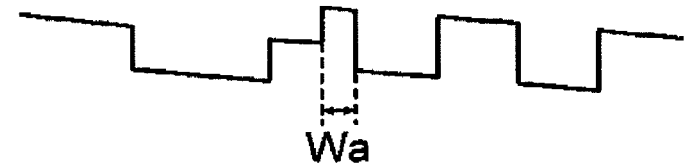
Figure 8D:

FIG. 7 is a schematic diagram of another example of a first optical path difference providing structure.

Each of FIGS. 8a, 8b, 8c and 8d is a schematic diagram of the situation of removing a step with minute width generated when two types of basic structures are overlapped together.

Figure 9A:
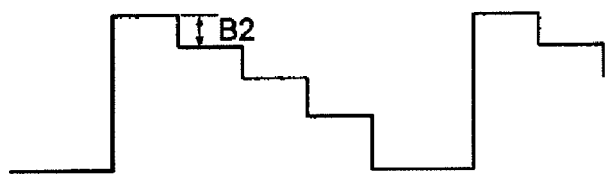
Figure 9B:
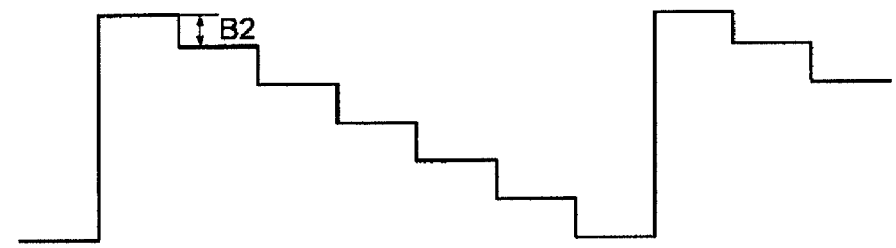

Each of FIGS. 9a and 9b is a schematic diagram of another example of a first optical path difference providing structure.

Figure 10:
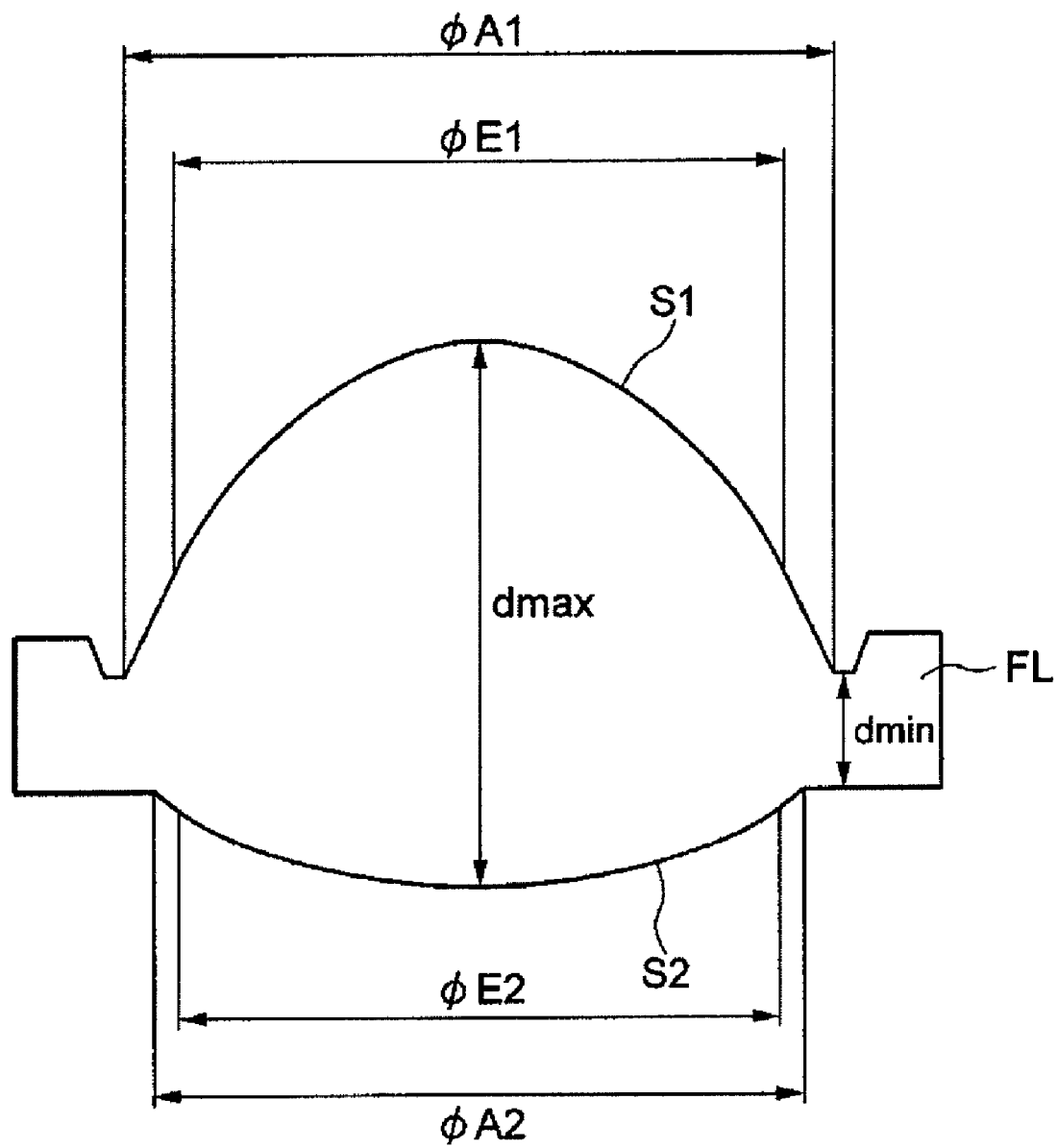

FIG. 10 is an outside appearance view of a cross section of one example of the objective lens, including the optical axis.

Figure 11A:
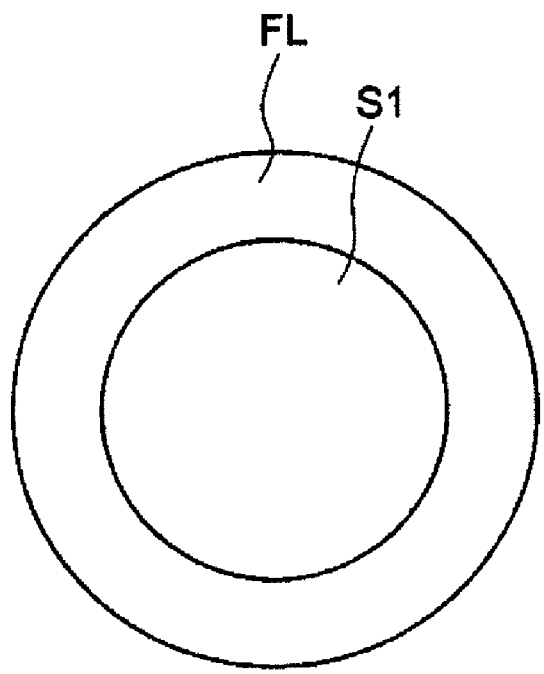
Figure 11B:
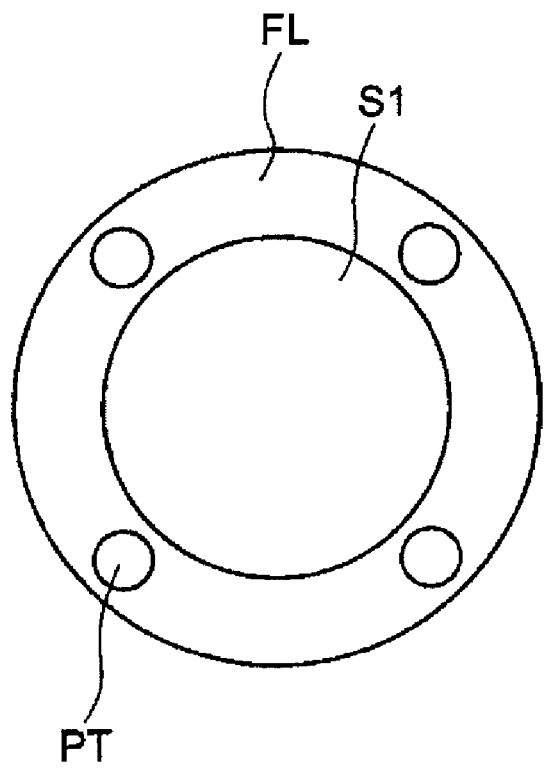

Each of Figs. 11a and 11b is an outside appearance view of one example of the objective lens viewed in the optical axis direction.

Figure 12A:
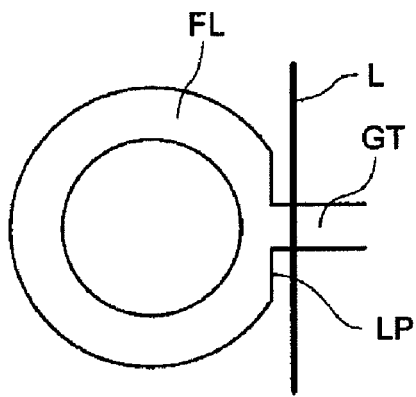
Figure 12B:
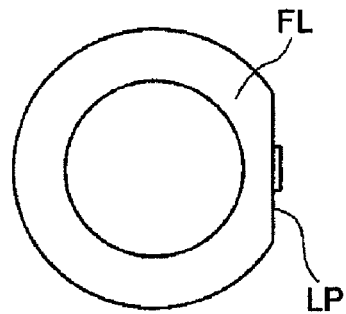

Each of FIGS. 12a and 12b is a diagram showing one example of cutting the gate of the objective lens.

Figure 13A:
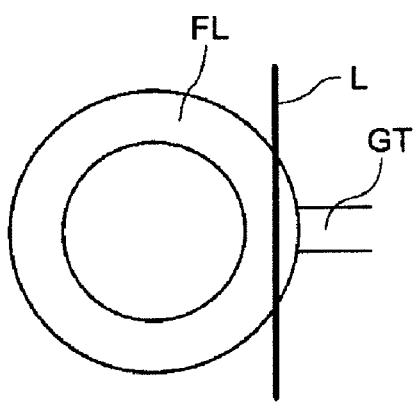
Figure 13B:
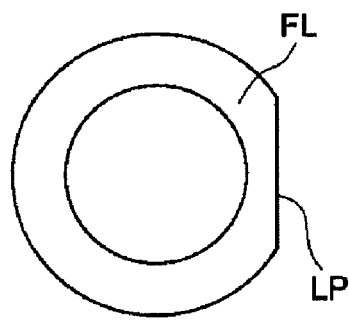

Each of FIGS. 13a and 13b is a diagram showing another example of cutting the gate of the objective lens.

Figure 14A:
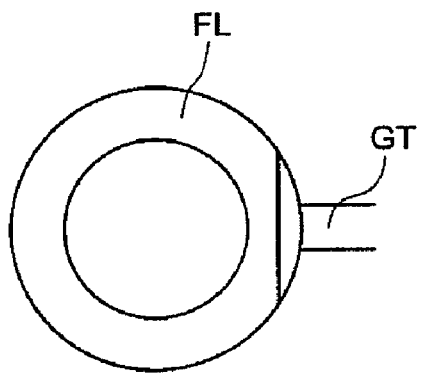
Figure 14B:
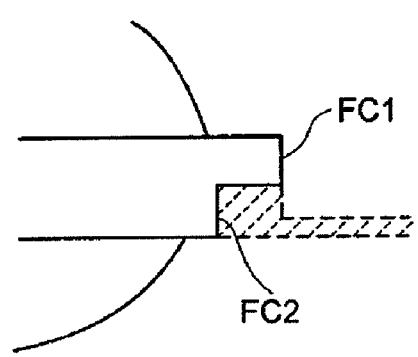

Each of FIGS. 14a and 14b is a diagram showing another example of cutting the gate of the objective lens.

Figure 15A:
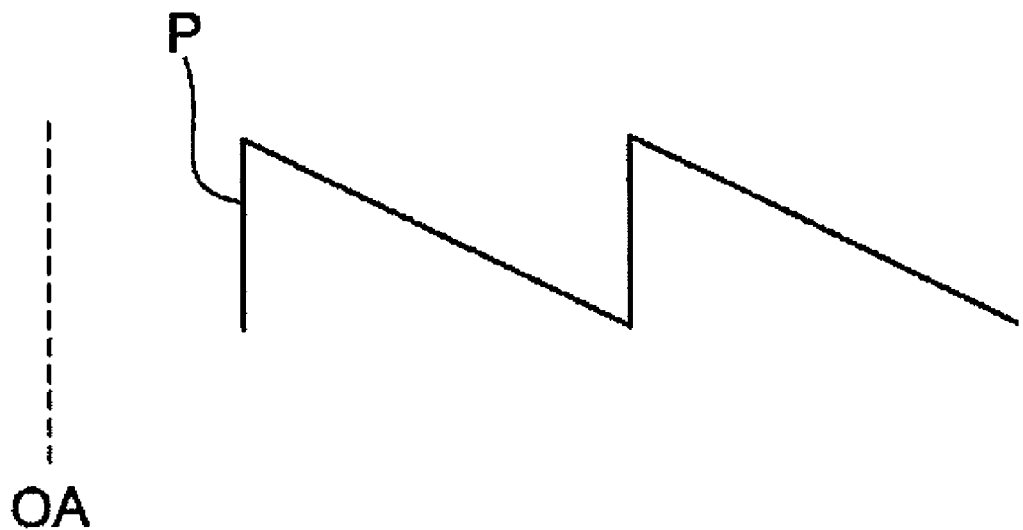
Figure 15B:
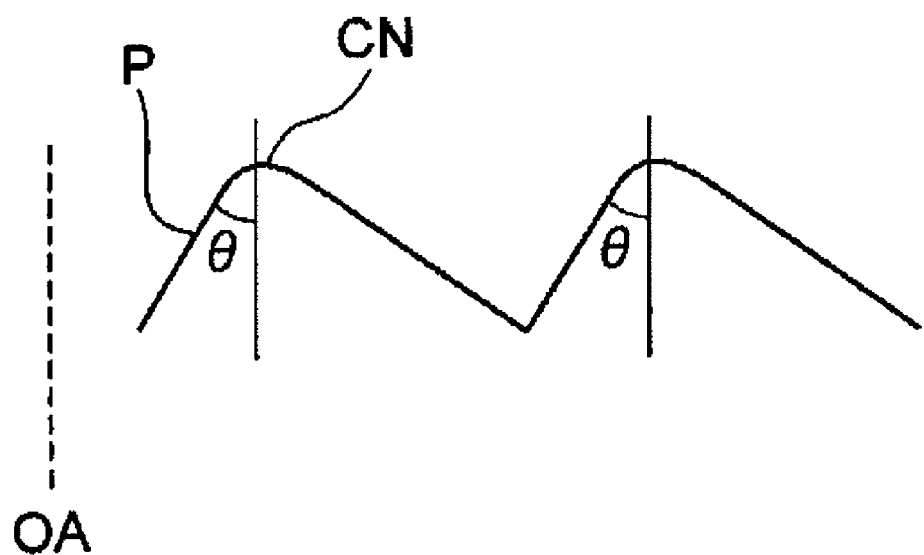

Each of FIGS. 15a and 15b is a diagram showing one example of a processed form of an optical path difference providing structure.

Figure 16:
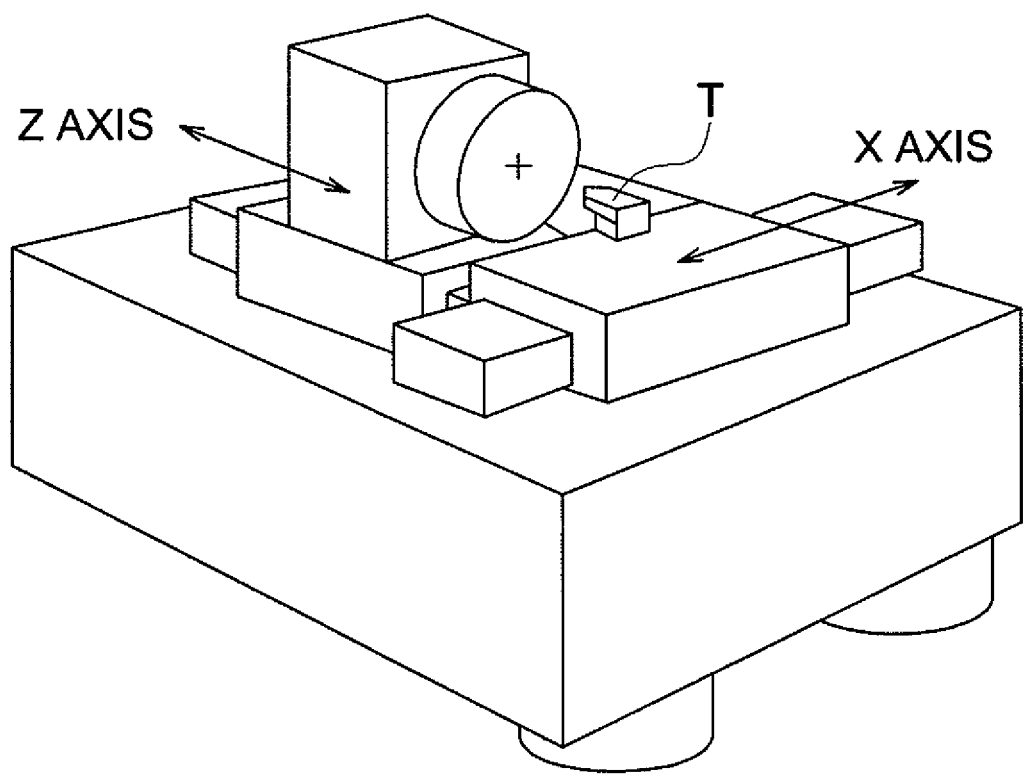

FIG. 16 is an outside appearance view of a double-shaft processing machine.

Figure 17A:
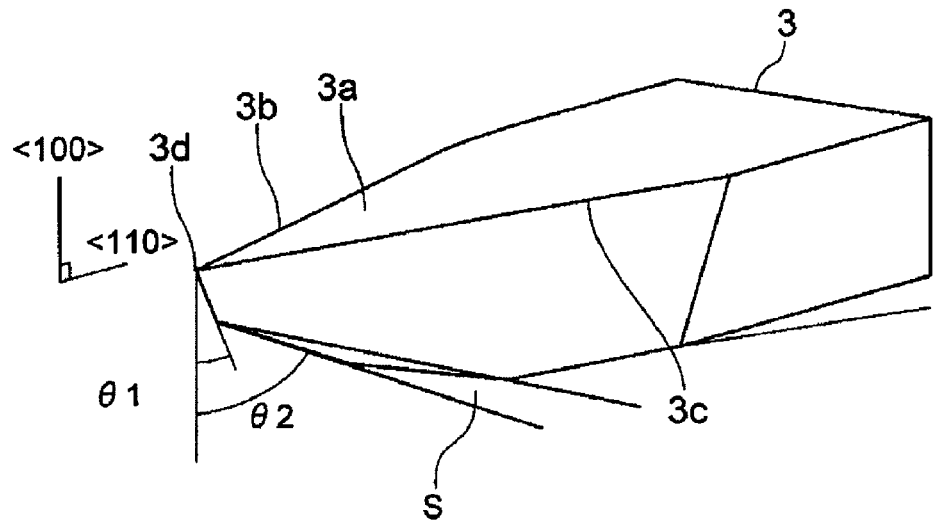
Figure 17B:
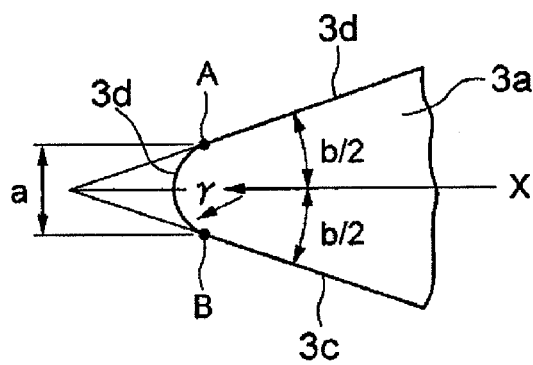

Each of FIGS. 17a and 17b is an outside appearance view of a point cutting tool.

Figure 18:
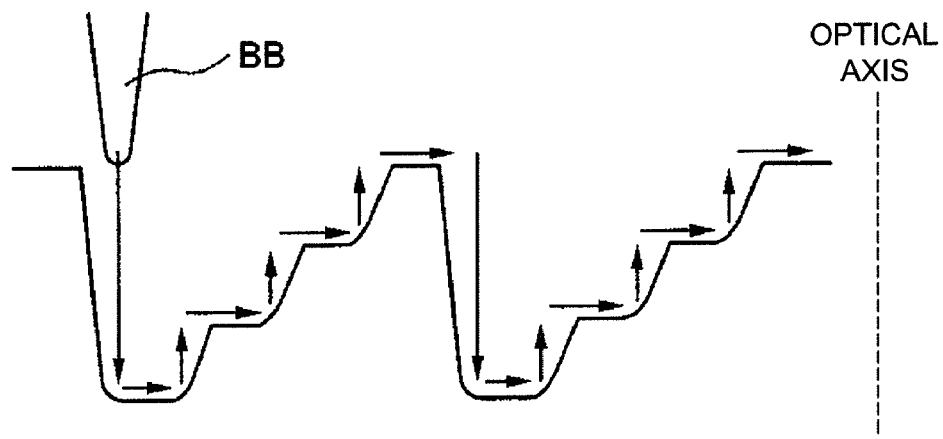

FIG. 18 is a diagram showing another example of a processed form of an optical path difference providing structure.

Figure 19:
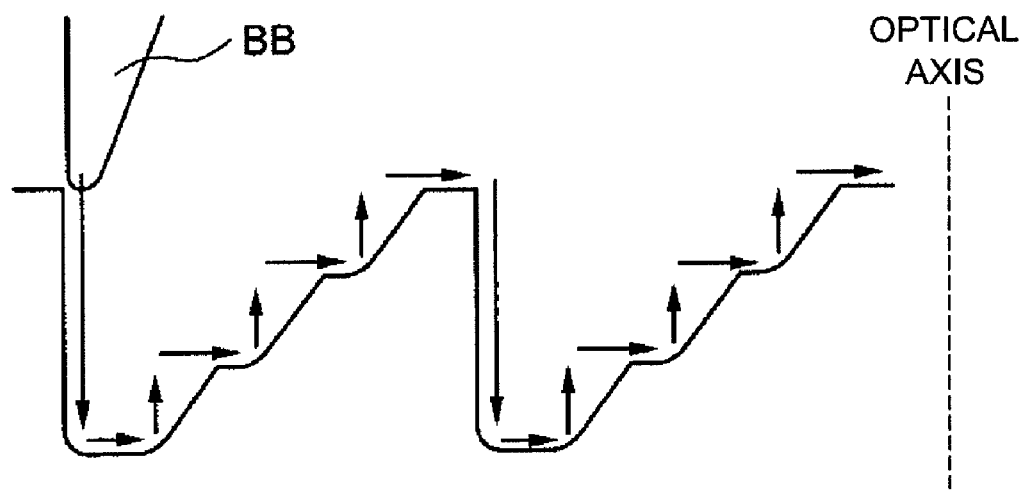

FIG. 19 is a diagram showing another example of a processed form of an optical path difference providing structure.

Figure 20:
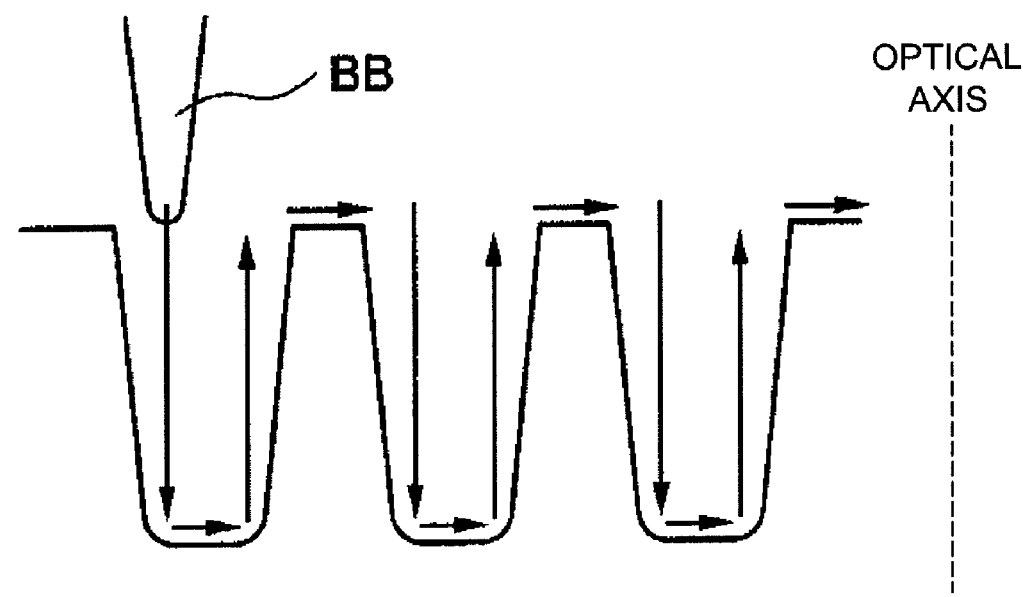

FIG. 20 is a diagram showing another example of a processed form of an optical path difference providing structure.

Figure 21:
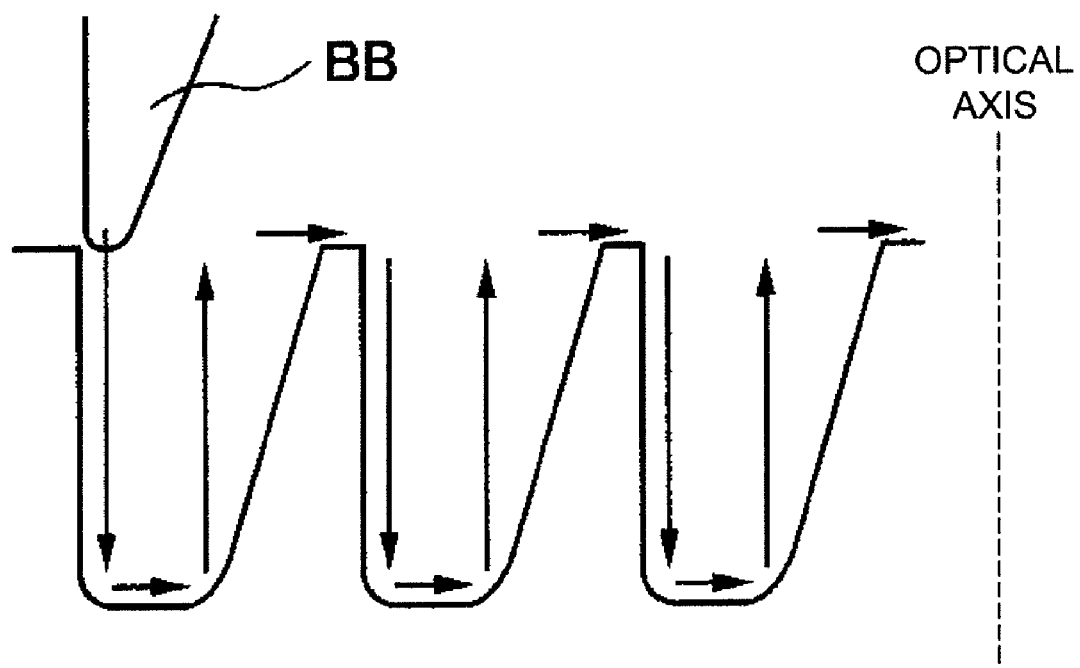

FIG. 21 is a diagram showing another example of a processed form of an optical path difference providing structure.

Figure 22:
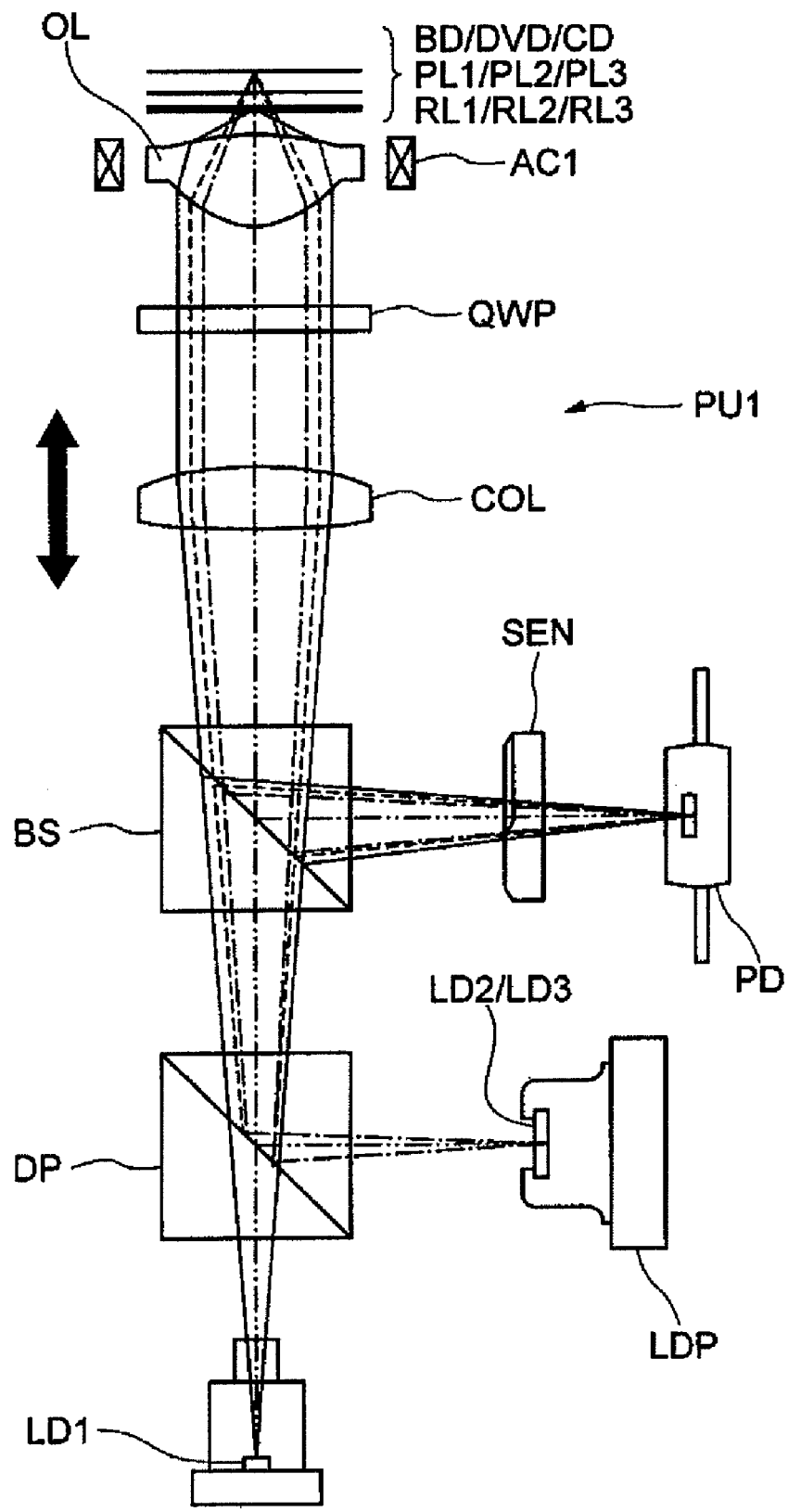

FIG. 22 is a diagram schematically showing a structure of optical pickup device PU1 of the present embodiment, which can record and/or reproduce information properly for a BD, DVD and CD as different optical discs.

Figure 23:
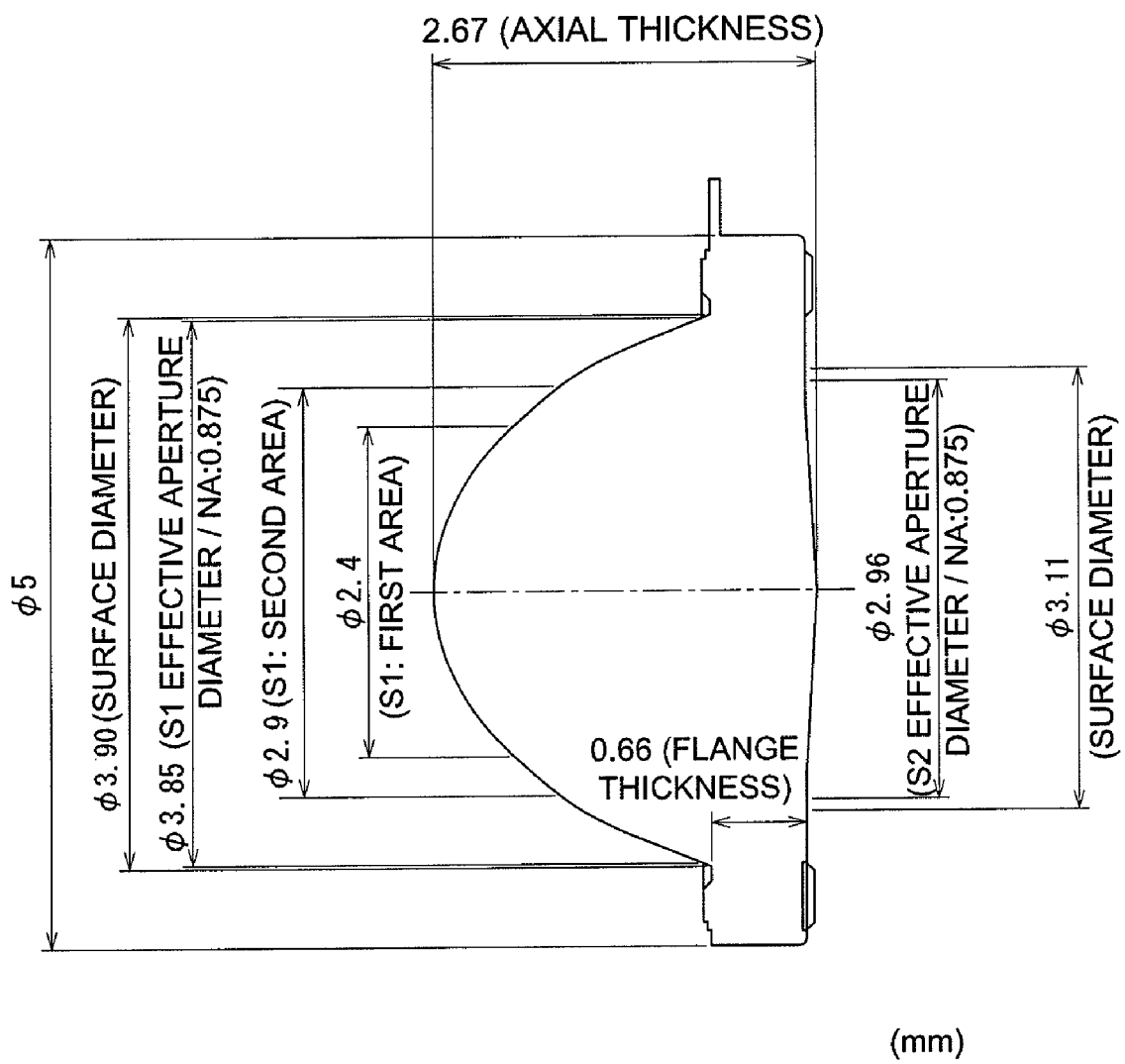

FIG. 23 is an outline view of a cross section of the objective lens relating to Example 1, including the optical axis.

Figure 24:
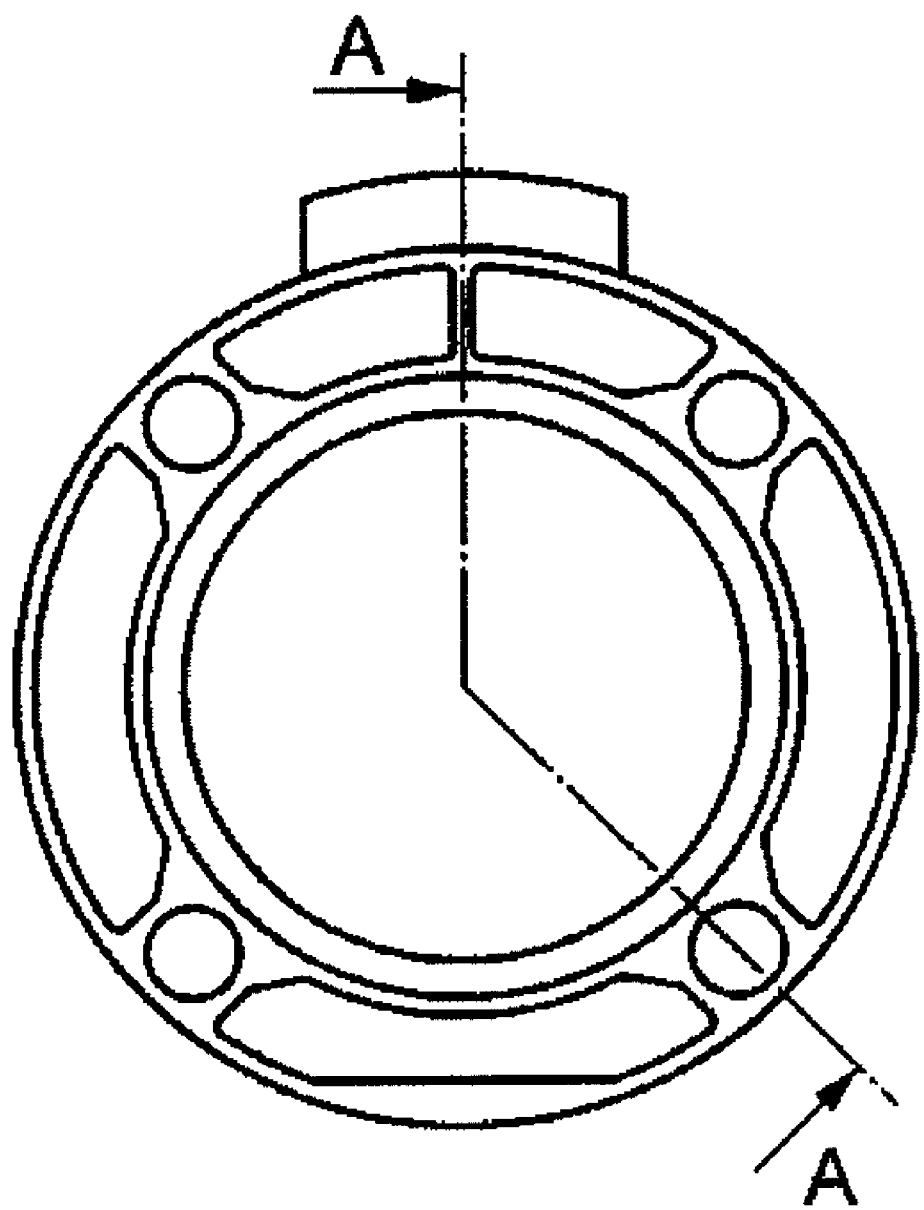

FIG. 24 is an outline view of the objective lens relating to Example 1, viewed in the optical axis direction from the side of the second optical surface.

Figure 25:
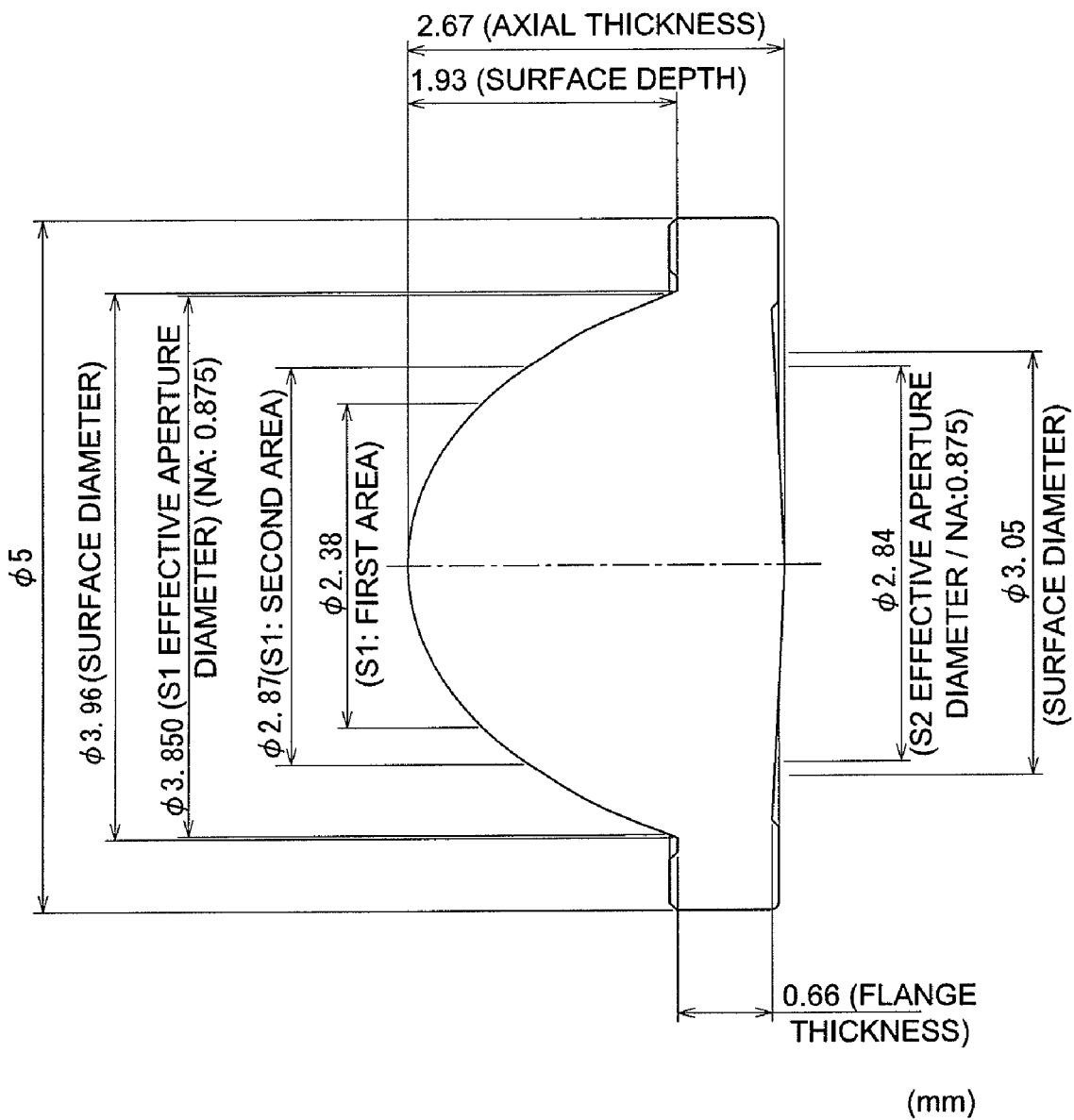

FIG. 25 is an outline view of a cross section of the objective lens relating to Example 2, including the optical axis.

Figure 26:
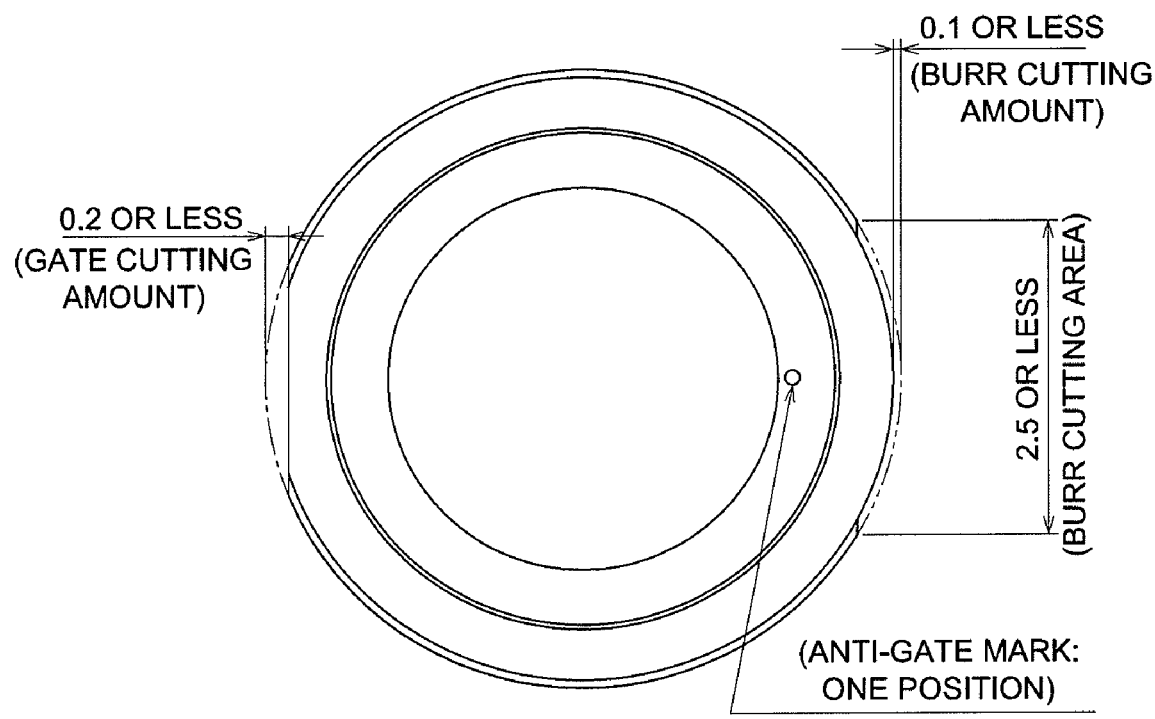

FIG. 26 is an outline view of the objective lens relating to Example 2, viewed in the optical axis direction from the side of the second optical surface.

DESCRIPTION OF EMBODIMENTS

Referring to the drawings, the embodiment of the present invention will be described below. FIG. 22 is a diagram schematically showing a construction of the optical pickup device PU1 of the present embodiment capable of recording and/or reproducing information adequately for a BD, DVD and CD which are different optical discs. The optical pickup device PU1 can be mounted in the optical information recording and reproducing device. Herein, the first optical disc is a BD, the second optical disc is a DVD, and the third optical disc is a CD. Hereupon, the present invention is not limited to the present embodiment.

Optical pickup device PU1 comprises objective lens OL, quarter wavelength plate QWP, collimation lens COL, polarization beam splitter BS, dichroic prism DP, first semiconductor laser LD1 (first light source), laser unit LDP, sensor lens SEN, and light-receiving element PD as a light-receiving element. The first semiconductor laser LD1 (first light source) emits a laser light flux with a wavelength λ1 of 405 nm (the first light flux) when information is recorded/reproduced for a BD. The laser unit LDP includes second semiconductor laser LD2 (second light source) emitting a laser light flux with a wavelength of 660 nm (second light flux) when information is recorded/reproduced for a DVD, and third semiconductor laser LD3 (third light source) emitting a laser light flux with a wavelength of 785 nm (third light flux) when information is recorded/reproduced for a CD, which are unitized in one body.

Figure 1:
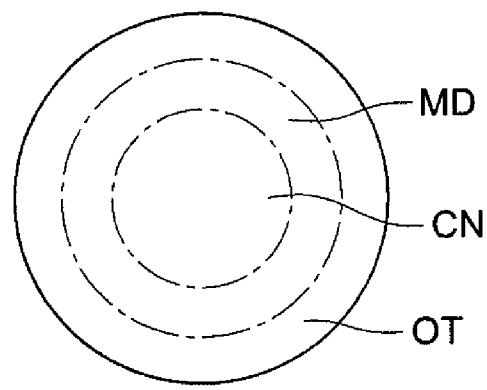
FIG. 1 is a diagram of objective lens OL being a single lens, relating to the present invention, viewed in the optical axis direction.
Figure 2:
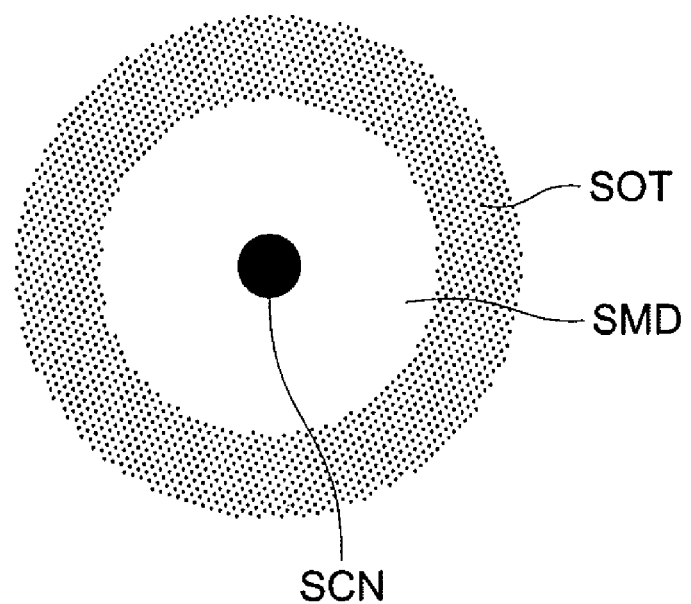
FIG. 2 is a diagram showing a condition of a spot which is formed on the information recording surface of the third optical disc out of the third light flux which has passed through the objective lens.
Figure 3A:
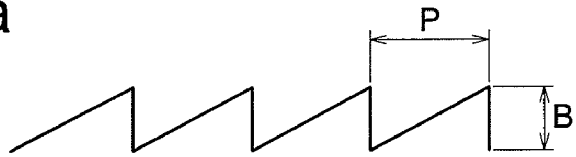
Figure 3B:
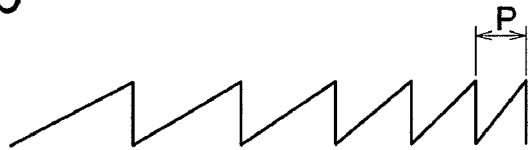
Figure 3C:
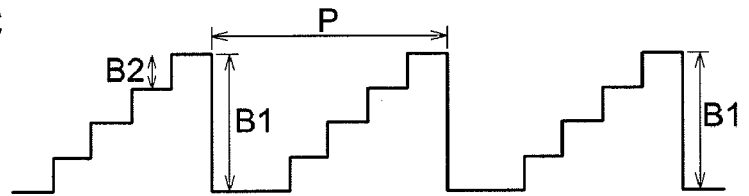
Figure 3D:
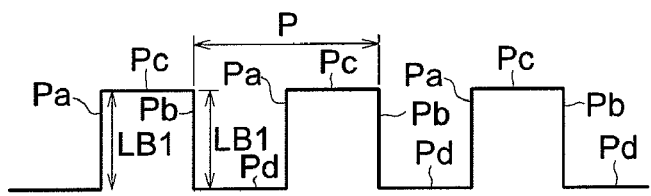

As shown in FIG. 1, objective lens OL which relates to the present embodiment is provided as a single lens includes an aspheric optical surface at the light source side on which central area. CN including the optical axis, intermediate area MD arranged around the central area, and peripheral area OT arranged around the peripheral area are formed into concentric rings around the optical axis. The above-described first optical path difference providing structure is formed in central area CN, and the above-described second optical path difference providing structure is formed in intermediate area MD. In peripheral area OT, the third optical path difference providing structure is formed. The objective lens of the present embodiment is a plastic lens. As the plastic material in the present embodiment, the material whose product name is APEL produced by Mitsui Chemicals, Inc. is employed.

A first light flux (λ1=405 nm) as a divergent light flux emitted from blue-violet semiconductor laser LD1, as illustrated by solid lines, passes through dichroic prism DP and polarization beam splitter BS, and is converted into a collimated light flux by collimation lens COL. Quarter wavelength plate QWP converts the polarization of the collimated light from linear polarization to circular polarization. Then, the diameter of the resulting light flux is regulated by an unillustrated stop and the light flux enters objective lens OL. A light flux converged by the central area, intermediate area, and peripheral area of objective lens OL, forms a spot on information recording surface RL1 of a BD through protective substrate PL1 with thickness of 0.1 mm.

The light flux on information recording surface RL1 is reflected and modulated by information pits on the information recording surface RL1. The reflected light flux passes through objective lens OL and the unillustrated stop again, and quarter wavelength plate QWP converts the polarization of the light flux from circular polarization to linear polarization. Then, collimation lens COL converts the light flux into a convergent light flux. The convergent light flux is reflected by polarization beam splitter BS and is converged on a light-receiving surface of light receiving element PD through sensor lens SEN. Then, information recorded in a BD can be read based on the output signal of light-receiving element PD, by performing focusing and tracking operations for objective lens OL using two-axis actuator AC1. When the wavelength changes in the first light flux due to unevenness of wavelength coming from an individual difference of semiconductor laser LD1 or due to temperature change or when information is recorded and/or reproduced for a BD including plural information recording layers, collimation lens COL as a magnification changing means is displaced in the direction of the optical axis to change a divergent angle or convergent angle of a light flux entering objective lens OL. Thereby, spherical aberration caused because of the wavelength change or the difference of the information recording layers can be corrected.

A second light flux ($\lambda 2=660$ nm) as a divergent light flux is emitted from semiconductor laser LD2 in laser unit LDP. As illustrated by dotted lines, the emitted divergent light flux is reflected by dichroic prism DP and passes polarization beam splitter BS and collimation lens COL. Then, quarter wavelength plate QWP converts the polarization of the light flux from linear polarization to circular polarization, and the resulting light flux enters objective lens OL. Herein, a light flux converged by the central area and the intermediate area of objective lens OL becomes a spot formed on information recording surface PL2 of a DVD through protective substrate PL2 with thickness of 0.6 mm, to form a central spot portion, where a light flux passing through the peripheral area is formed into flare light to form a peripheral spot portion.

The light flux on information recording surface RL2 is reflected and modulated by the information pits on the information recording surface RL2. The reflection light flux passes through objective lens OL again, and quarter wavelength plate QWP converts the polarization of the light flux from circular polarization to linear polarization. The resulting light flux is formed into a convergent light flux by collimation lens COL, and reflected by polarization beam splitter BS. Then, the light flux is converged on a light-receiving surface of light-receiving element PD through sensor lens SEN. Then, the information recorded in a DVD can be read by using the output signal of light-receiving element PD.

A third light flux ($\lambda 3=785$ nm) as a divergent light flux is emitted from semiconductor laser LD3 in laser unit LDP. As illustrated by long dashed short dashed lines, the divergent light flux is reflected by dichroic prism DP, and passes polarization beam splitter BS and collimation lens COL. Then, quarter wavelength plate QWP converts the polarization of the light flux from linear polarization to circular polarization and the resulting light flux enters objective lens OL. Herein, the incident light flux is converged by the central area of objective lens OL forms a spot on information recording surface PL3 of CD through protective substrate PL3 with thickness of 1.2 mm, where a light flux passing through the intermediate area and the peripheral area is formed into a flare light to form a peripheral spot portion.

The light flux on information recording surface RL3 is reflected and modulated by the information pit on the information recording surface RL3. The reflection light flux passes through objective lens OL again, and quarter wavelength plate QWP converts the polarization of the light flux from circular polarization from linear polarization. The resulting light is formed into a convergent light flux by collimation lens COL and reflected by polarization beam splitter BS. Then, the light flux is converged on a light-receiving surface of the light-receiving element PD through sensor lens SN. Then, information recorded in a CD can be read by using output signal of the third light-receiving element PD.

EXAMPLES

Hereinafter, examples which are applicable to the above embodiments will be described.

Example 1

FIG. 23 shows an outline view of a cross section of the objective lens relating to Example 1, including the optical axis.

As can be seen from FIG. 23, various dimensions of the objective lens of Example 1 have values shown in Table 2.

TABLE 2

| | |
|---|---|
| Axial thickness of the objective lens (dmax) | 2.67 mm |
| Thickness of the objective lens at a position where the objective lens is thinnest in a direction of the optical axis (drain) | 0.66 mm |
| Deviation ratio of thickness (dmax/dmin) | 4.05 |
| Overall diameter of the first optical surface ($\Phi A1$) | 3.90 mm |
| Diameter of the peripheral area on the first optical surface ($\Phi E1$) | 3.85 mm |
| 100*$\Phi E1/\Phi A1$ | 98.7% |
| Overall diameter of the second optical surface ($\Phi A2$) | 3.11 mm |
| Diameter of an area of the second optical surface corresponding to the peripheral area ($\Phi E2$) | 2.96 mm |
| 100*$\Phi E2/\Phi A2$ | 95.2% |

Further, FIG. 24 is an outline view of the objective lens relating to Example 1, viewed in the optical axis direction from the second optical surface side. As can be seen from FIG. 24, the objective lens relating to the present example includes four prints of pins coming from a pin ejection on the surface at the second optical surface side in the flange section. The prints of pins are recessed with minute depth, which causes a possibility that the thickness of the objective lens at a position where the objective lens is thinnest in the optical axis direction is slightly smaller than 0.66 mm. However, the depth is minute and the flange thickness is assumed to be the thickness of the objective lens at a position where the objective lens is thinnest in the optical axis direction in this example. Further, as can be seen from FIG. 24, the objective lens of Example 1 has air-vent burrs coming from an air vent. The air-vent burrs are removed.

Next, an antireflection film of Example 1 will be described.

On the first optical surface including an optical path difference providing structure, there is provided a three-layer antireflection film shown in the following Table 3 with an evaporation deposition method.

TABLE 3

| | Coating material | Layer thickness (nm) |
|---|---|---|
| 3rd layer | SiO$_2$ | 114 |
| 2nd layer | ZrO$_2$ | 16 |
| 1st layer | SiO$_2$ | 17 |
| Base material of the objective lens | APEL made by Mitsui Chemicals, Inc. | — |

On the second optical surface where an optical path difference providing structure is not arranged, there is provided a seven-layer antireflection film shown in the following Table 4 with an evaporation deposition method.

TABLE 4

| | Coating material | Layer thickness (nm) |
|---|---|---|
| 7th layer | Mixture material of SO$_2$ and almina | 99 |
| 6th layer | ZrO$_2$ | 60 |
| 5th layer | SiO$_2$ | 15 |
| 4th layer | ZrO$_2$ | 58 |
| 3rd layer | Mixture material of SO$_2$ and almina | 48 |
| 2nd layer | ZrO$_2$ | 16 |
| 1st layer | SiO$_2$ | 114 |
| Base material of the objective lens | APEL made by Mitsui Chemicals, Inc. | — |

Next, an aspheric shape of an optical surface and an optical path difference providing structure of the objective lens of Example 1 will be described. The first optical path difference providing structure of Example 1 corresponds to the above-described Embodiment 1-1.

The objective lens of Example 1 is a single lens made of plastic. The first optical path difference providing structure of Example 1, is an optical path difference providing structure formed by overlapping a second basic structure being a blaze-type diffractive structure wherein |L|, |M|, |N| are 2, 1, 1, respectively, and a first basic structure being a blaze-type diffractive structure wherein |X|, |Y|, |Z| are 1, 1, 1, respectively, together, in the whole of central area CN. The step difference surfaces of the second basic structure face the optical axis direction and the step difference surfaces of the first basic structure face the direction opposite to the optical axis. Further, the pitches of the first basic structure and the pitches of the second basic structure are adjusted. The positions of all the step difference surfaces of the second basic structure match with the positions of the step difference surfaces of the first basic structure. It can be found that the average pitch of the first basic structure is smaller than the pitch of the second basic structure and the number of step difference surfaces facing the direction opposite to the optical axis of the first basic structure is greater than the number of step difference surfaces facing the optical axis direction of the second basic structure.

The first optical path difference providing structure of Example 1 satisfies the following conditional expressions (6)″ and (7)″. In the expressions, d11 represents the amount of step differences facing the direction opposite to the optical axis of the first basic structure and d12 represents the amount of step differences facing the optical axis direction of the second basic structure.

$$0.9 \cdot (\lambda 1/(n-1)) < d11 < 1.5 \cdot (\lambda 1/(n-1)) \quad (6)''$$

$$0.9 \cdot (\lambda 1/(n-1)) < d12 < 1.5 \cdot (\lambda 1/(n-1)) \quad (7)''$$

In Example 1, because the wavelength λ1 is 405 nm (0.405 μm) and n is 1.5592, the step differences amounts d11 and d12 satisfy the following conditional expressions.

$$0.65 \,\mu m < d11 < 1.09 \,\mu m$$

$$0.65 \,\mu m < d12 < 1.09 \,\mu m$$

The second optical path difference providing structure of Example 1, is an optical path difference providing structure formed by overlapping a fifth basic structure with the structure formed by overlapping a third basic structure which is the same as the first basic structure and a fourth basic structure which is the same as the second basic structure, in the whole of intermediate area MD. The fifth basic structure of Example 1 is a two-level step-type diffractive structure (a binary structure) which emits a 0th-order diffracted light flux with a larger light amount than diffracted light fluxes with any other diffraction orders, when the first light flux passes through the fifth basic structure, emits a 0th-order diffracted light flux with a larger light amount than diffracted light fluxes with any other diffraction orders, when the second light flux passes through the fifth basic structure, and emits a ±1st-order diffracted light flux with a larger light amount than diffracted light fluxes with any others diffraction order, when the third light flux passes through the fifth basic structure.

The third optical path difference providing structure of Example 1, is an optical path difference providing structure composed of only a eighth basic structure on the whole of peripheral area OT. The eighth basic structure of Example 1 is a blaze-type structure which emits a first-order diffracted light flux with a larger light amount than diffracted light fluxes with any other diffraction orders, when the first light flux passes through the eighth basic structure, emits a first-order diffracted light flux with a larger light amount than diffracted light fluxes with any other diffraction orders, when the second light flux passes through the eighth basic structure, and emits a first-order diffracted light flux with a larger light amount than diffracted light fluxes with any other diffraction orders, when the third light flux passes through the eighth basic structure.

The step difference surfaces of the optical path difference providing structures of Example 1, are oblique with respect to the optical axis, and corner portions of the optical path difference providing structures have curvature. The angle of each step difference surface at the optical axis side and the optical axis is 14° to 15°, and the angle of each step difference surface at the side opposite to the optical axis and the optical axis is 14° to 15°. The curvature radius of each corner portion is in the range of 0.4 to 5 μm. A point cutting tool for cutting the optical path difference providing structures of Example 1 has an apex angle in the range of 28° to 30°, and is attached to a processing machine vertically.

Example 2

FIG. 25 shows an outline view of a cross section of the objective lens relating to Example 2, including the optical axis.

As can be seen from FIG. 25, various dimensions of the objective lens of Example 2 have values shown in Table 5.

TABLE 5

| | |
|---|---|
| Axial thickness of the objective lens (dmax) | 2.67 mm |
| Thickness of the objective lens at a position where the objective lens is thinnest in a direction of the optical axis (dmin) | 0.66 mm |

TABLE 5-continued

| | |
|---|---|
| Deviation ratio of thickness (dmax/dmin) | 4.05 |
| Overall diameter of the first optical surface (ΦA1) | 3.96 mm |
| Diameter of the peripheral area on the first optical surface (ΦE1) | 3.85 mm |
| 100*ΦE1/ΦA1 | 97.2% |
| Overall diameter of the second optical surface (ΦA2) | 3.05 mm |
| Diameter of an area of the second optical surface corresponding to the peripheral area (ΦE2) | 2.84 mm |
| 100*ΦE2/ΦA2 | 93.1% |

Further, FIG. 26 is an outline view of the objective lens relating to Example 2, viewed in the optical axis direction from the second optical surface side. As can be seen from FIG. 26, the objective lens relating to the present Example is not formed by a pin ejection, and no prints of pins coming from a pin ejection appears in the flange section. Further, it can be found that the gate has been removed by cutting linearly, and air-vent burrs coming from air vent processing has been removed.

The antireflection films of Example 2 are similar to those of Example 1.

Next, an aspheric shape of an optical surface and an optical path difference providing structure of the objective lens of Example 2 will be described. The first optical path difference providing structure of Example 2 corresponds to the above-described Embodiment 2-1.

The objective lens of Example 2 is a single lens made of plastic. The first optical path difference providing structure of Example 2, is an optical path difference providing structure formed only by a seven-level step-type basic structure |X|, |Y|, |Z| are 1, −2, −3, respectively, in the whole of central area CN.

The first optical path difference providing structure of Example 2 satisfies the following conditional expressions (17). In the expressions, B2 represents the step difference amount of small step differences of the step-type structure.

$$0.6 \cdot (1.16 \cdot \lambda 1/(n-1)) < B2 < 1.5 \cdot (1.16 \cdot \lambda 1/(n-1)) \quad (17)$$

The second optical path difference providing structure of Example 2, is an optical path difference providing structure formed only by a seventh basic structure in the whole of intermediate area MD. The seventh basic structure of Example 1 is a three-level step-type diffractive structure which emits a 0th-order diffracted light flux with a larger light amount than diffracted light fluxes with any other diffraction orders, when the first light flux passes through the seventh basic structure, emits a −1st-order diffracted light flux with a larger light amount than diffracted light fluxes with any other diffraction orders, when the second light flux passes through the seventh basic structure, and emits a −1st-order diffracted light flux with a larger light amount than diffracted light fluxes with any others diffraction order, when the third light flux passes through the seventh basic structure.

The third optical path difference providing structure of Example 2, is an optical path difference providing structure composed of only a eighth basic structure on the whole of peripheral area OT. The eighth basic structure of Example 2 is a blaze-type structure which emits a first-order diffracted light flux with a larger light amount than diffracted light fluxes with any other diffraction orders, when the first light flux passes through the eighth basic structure, emits a first-order diffracted light flux with a larger light amount than diffracted light fluxes with any other diffraction orders, when the second light flux passes through the eighth basic structure, and emits a first-order diffracted light flux with a larger light amount than diffracted light fluxes with any other diffraction orders, when the third light flux passes through the eighth basic structure.

The step difference surfaces of the optical path difference providing structures of Example 2, are oblique with respect to the optical axis, and corner portions of the optical path difference providing structures have curvature. The angle of each step difference surface at the optical axis side and the optical axis is 14° to 15°, and the angle of each step difference surface at the side opposite to the optical axis and the optical axis is 14° to 15°. The curvature radius of each corner portion is in the range of 0.4 to 5 μm. A point cutting tool for cutting the optical path difference providing structures of Example 2 has an apex angle in the range of 28° to 30°, and is attached to a processing machine vertically.

Example 3

The outline view of a cross section of the objective lens relating to Example 3, including the optical axis and the outline view from the optical axis side are same to those of Example 1.

Further, antireflection films of Example 3 are the same as those of Example 1.

Next, an aspheric shape of an optical surface and an optical path difference providing structure of the objective lens of Example 3 will be described. The first optical path difference providing structure of Example 3 corresponds to the above-described Embodiment 1-2.

The objective lens of Example 3 is a single lens made of plastic. The first optical path difference providing structure of Example 3 is an optical path difference providing structure formed by overlapping the first basic structure being a blaze-type structure and the second basic structure being a step-type structure together, in the whole of central area CN.

The first basic structure as a blaze-type structure emits a second-order diffracted light flux with a larger light amount than diffracted light fluxes with any other diffraction orders, when the first light flux passes through the first basic structure, emits a first-order diffracted light flux with a larger light amount than diffracted light fluxes with any other diffraction orders, when the second light flux passes through the first basic structure, and emits a first-order diffracted light flux with a larger light amount than diffracted light fluxes with any other diffraction orders, when the third light flux passes through the first basic structure.

The second basic structure as a two-level step-type structure (binary structure) emits a 0-th-order diffracted light flux with a larger light amount than diffracted light fluxes with any other diffraction orders, when the first light flux passes through the second basic structure, emits a 0-th-order diffracted light flux with a larger light amount than diffracted light fluxes with any other diffraction orders, when the second light flux passes through the second basic structure, and emits a ±first-order diffracted light flux with a larger light amount than diffracted light fluxes with any other diffraction orders, when the third light flux passes through the second basic structure.

The second optical path difference providing structure of Example 3, is an optical path difference providing structure formed only by a fifth basic structure in the whole of intermediate area MD. The fifth basic structure of Example 3 being a blaze-type structure emits a second-order diffracted light flux with a larger light amount than diffracted light fluxes with any other diffraction orders, when the first light flux passes through the fifth basic structure, emits a first-order diffracted light flux with a larger light amount than diffracted light fluxes with any other diffraction orders, when the second light flux passes through the fifth basic structure, and emits a first-order diffracted light flux with a larger light amount than diffracted light fluxes with any others diffraction order, when the third light flux passes through the fifth basic structure.

The third optical path difference providing structure of Example 3, is an optical path difference providing structure composed of only a eighth basic structure on the whole of peripheral area OT. The eighth basic structure of Example 3 is a blaze-type structure which emits a fifth-order diffracted light flux with a larger light amount than diffracted light fluxes with any other diffraction orders, when the first light flux passes through the eighth basic structure, emits a third-order diffracted light flux with a larger light amount than diffracted light fluxes with any other diffraction orders, when the second light flux passes through the eighth basic structure, and emits a second-order diffracted light flux with a larger light amount than diffracted light fluxes with any other diffraction orders, when the third light flux passes through the eighth basic structure.

The step difference surfaces of the optical path difference providing structures of Example 3, are oblique with respect to the optical axis, and corner portions of the optical path difference providing structures have curvature. The angle of each step difference surface at the optical axis side and the optical axis is 26° to 28°, and the angle of each step difference surface at the side opposite to the optical axis and the optical axis is 2° to 3°. The curvature radius of each corner portion is in the range of 0.4 to 5 μm. A point cutting tool for cutting the optical path difference providing structures of Example 3 has an apex angle in the range of 28° to 30°, and is attached to a processing machine to be tilted by 13°.

The present invention is not limited to the examples described in the present specification. It is to be understood that various changes and modifications will be apparent to those skilled in the art, based on the examples and ideas described in the specification. The descriptions and examples of the present specification are provided for illustrative purposes and the scope of the present invention will be defined by claims which will be described later.

REFERENCE SIGNS LIST

AC1 Two-axis actuator
BS Polarization beam splitter
CN Central area
COL Collimation lens
DP Dichroic prism
LD1 First semiconductor laser or Blue-violet semiconductor laser
LD2 Second semiconductor
LD3 Third semiconductor laser
LDP Laser unit
MD Intermediate area
OL Objective lens
OT Peripheral area
PD Light-receiving element
PL1 Protective substrate
PL2 Protective substrate
PL3 Protective substrate
PU1 Optical pickup device
QWP Quarter wavelength plate
RL1 Information recording surface
RL2 Information recording surface
RL3 Information recording surface
SEN Sensor lens

The invention claimed is:

1. An objective lens for an optical pickup device including a first light source for emitting a first light flux with a first wavelength $\lambda 1$, a second light source for emitting a second light flux with a second wavelength $\lambda 2$ ($\lambda 2 > 1$) and a third light source for emitting a third light flux with a third wavelength $\lambda 3$ ($\lambda 3 > \lambda 2$), the optical pickup device recording and/or reproducing information of a first optical disc including a protective substrate with a thickness t1 by using the first light flux, recording and/or reproducing information of a second optical disc including a protective substrate with a thickness t2 by using the second light flux, and recording and/or reproducing information of a third optical disc including a protective substrate with a thickness t3 by using the third light flux, the objective lens comprising a first optical surface and a second optical surface which are opposite to each other, wherein at least the first optical surface comprises at least three areas of a central area, an intermediate area surrounding the central area, and a peripheral area surrounding the intermediate area, the central area comprises a first optical path difference providing structure and the intermediate area comprises a second optical path difference providing structure, the objective lens converges the first light flux passing through the central area of the objective lens onto an information recording surface of the first optical disc so that information can be recorded and/or reproduced thereon, converges the second light flux passing through the central area of the objective lens onto an information recording surface of the second optical disc so that information can be recorded and/or reproduced thereon, and converges the third light flux passing through the central area of the objective lens onto an information recording surface of the third optical disc so that information can be recorded and/or reproduced thereon, the objective lens converges the first light flux passing through the intermediate area of the objective lens onto an information recording surface of the first optical disc so that information can be recorded and/or reproduced thereon, and converges the second light flux passing through the intermediate area of the objective lens onto an information recording surface of the second optical disc so that information can be recorded and/or reproduced thereon, the objective lens converges the first light flux passing through the peripheral area of the objective lens onto an information recording surface of the first optical disc so that information can be recorded and/or reproduced thereon, a ratio of a diameter of the peripheral area to an overall diameter of the first optical surface is 90% or more and is 100% or less, a ratio of a diameter of an effective aperture on the second optical surface corresponding to the peripheral area to an overall diameter of the second optical surface is 75% or more and is 100% or less, and the objective lens satisfies the following conditional expressions:

$$2 \leq dmax / dmin \leq 8 \quad (1),$$

$$0.9 \leq dmax / f \leq 1.5 \quad (2),$$

where dmax (mm) represents an axial thickness of the objective lens, dmin (mm) represents a thickness of the objective lens at a position where the objective lens is thinnest in a direction of an optical axis thereof, and f(mm) represents a focal length of the objective lens for the first light flux.

2. The objective lens of claim 1, wherein the first optical path difference providing structure is a structure in which a plurality of basic structures are overlapped together.

3. The objective lens of claim 2, wherein the plurality of basic structures are a first basic structure being a blaze-type structure and a second basic structure being a blaze-type structure.

4. The objective lens of claim 2, wherein the plurality of basic structures are a first basic structure being a blaze-type structure and a second basic structure being a step-type structure.

5. The objective lens of claim 1, wherein the first optical path difference providing structure consists of a single basic structure.

6. The objective lens of claim 5, wherein the basic structure is a step-type structure.

7. An optical pickup device comprising the objective lens of claim 1.

8. An optical information recording and reproducing device comprising the optical pickup device of claim 7.

* * * * *